United States Patent

Kawase

[11] Patent Number: 5,844,689
[45] Date of Patent: Dec. 1, 1998

[54] SYSTEM FOR IMAGE FORMATION AND IMAGE DISPLAY BASED ON AN EXTERNAL IMAGE SIGNAL

[75] Inventor: Michio Kawase, Kawasaki, Japan

[73] Assignee: Canon Kabushiki Kaisha, Tokyo, Japan

[21] Appl. No.: 742,148

[22] Filed: Oct. 31, 1996

[30] Foreign Application Priority Data

Nov. 2, 1995 [JP] Japan .................................. 7-285824

[51] Int. Cl.⁶ .................. H64N 1/00; G63F 3/10
[52] U.S. Cl. .................. 358/296; 358/434; 358/527; 395/114
[58] Field of Search .................. 358/296, 400, 358/401, 405–407, 434–439, 444, 448, 452, 468, 500, 501, 504, 527, 537; 382/308; 395/101, 109, 112, 114

[56] References Cited

U.S. PATENT DOCUMENTS

| | | | |
|---|---|---|---|
| 5,075,874 | 12/1991 | Steeves et al. .................. | 395/112 |
| 5,388,920 | 2/1995 | Ohara .................. | 395/112 X |
| 5,555,107 | 9/1996 | Funada et al. .................. | 358/518 |
| 5,592,307 | 1/1997 | Murai .................. | 358/468 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A system for displaying images is provided having a reading device for reading an image and generating an image signal, a forming device for forming an image based on the image signal generated by the reading device on a recording medium, a display device for displaying the image to be formed by the image forming device, and an input device for entering an image signal from an external equipment, wherein image formation by the image forming device and display by the display device are made possible based on the image signal entered by the input device.

23 Claims, 32 Drawing Sheets

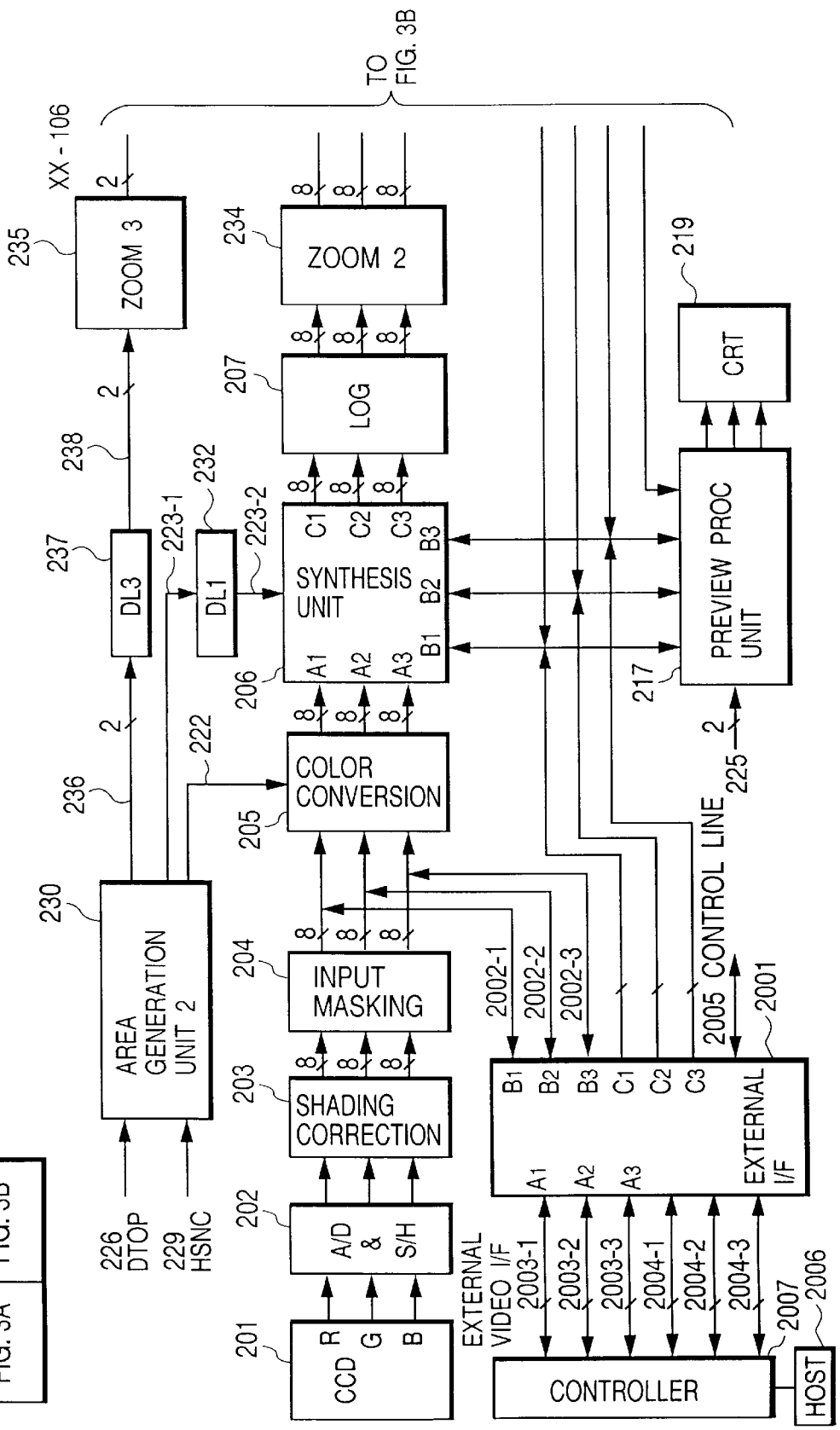

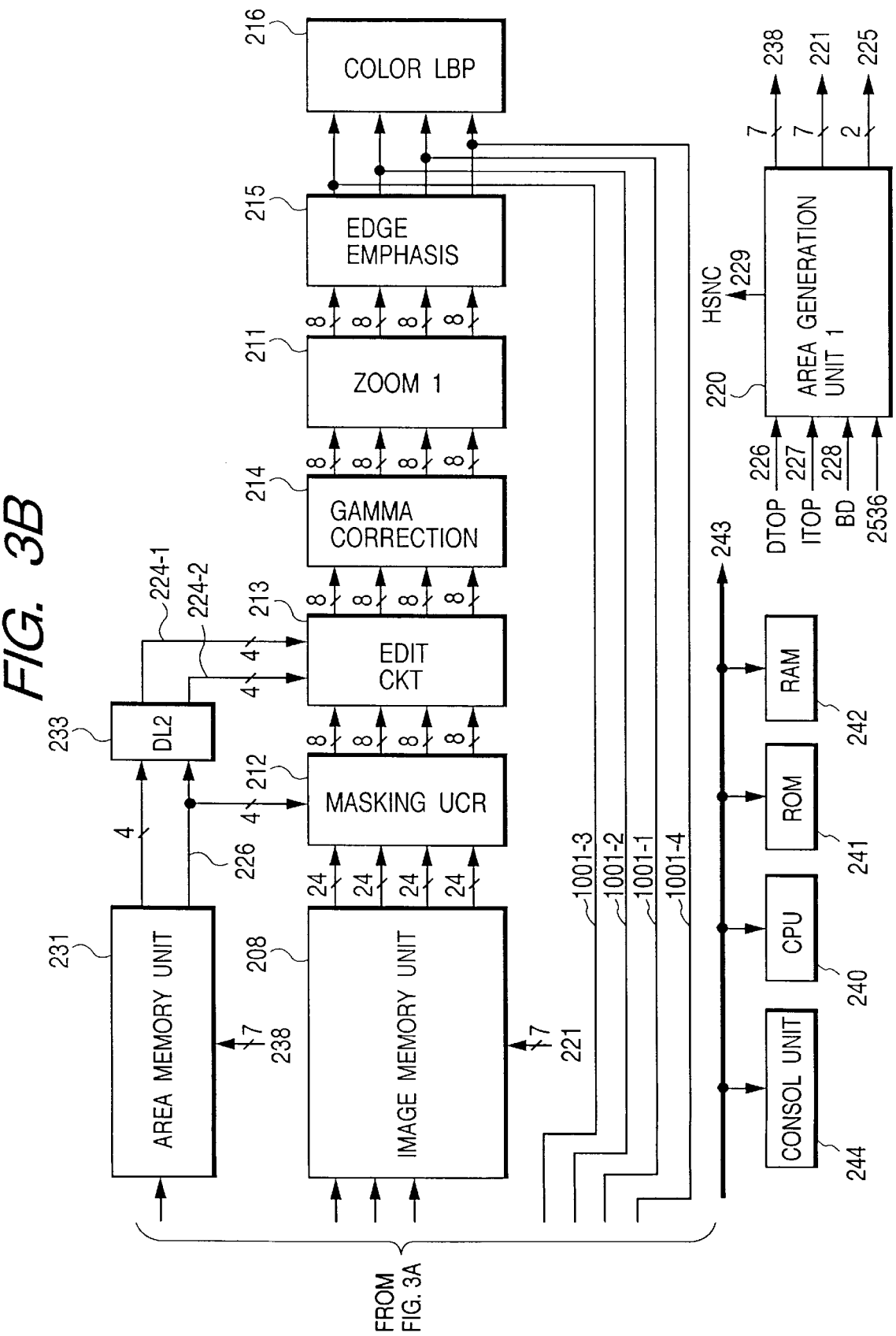

FIG. 14

|   | 224-1 | 224-2 | Y |
|---|---|---|---|
| A | 0 | 0 | THROUGH (A) |
| B | 1 | 0 | FREE COLOR (B) |
| C | 0 | 1 | PAINT (C) |
| D | 1 | 1 | THROUGH (D) |

FIG. 23

| CODE | COMMAND | CONTENTS |
|---|---|---|
| 01 | I/F CLEAR | THIS COMMAND IS GENERATED BY COPY MACHINE MAIN BODY AFTER INITIALIZATION OF MAIN BODY TERMINATES IN CASE OF POWER ON |
| 02 | PRINT START | THIS COMMAND IS GENERATED BY IMAGE TRANSFER ORIGIN, AND INCLUDES START REQUEST ORIGIN ADDRESS, START REQUEST DESTINATION ADDRESS, PAPER SELECTION, THE NUMBER OF PAPERS ETC. |
| 03 | STATUS REQUEST | THIS COMMAND IS GENERATED BY MASTER AT PREDETERMINED INTERVAL, AND INCLUDES REQUEST DESTINATION ADDRESS |
| 04 | STATUS TRANSFER | THIS COMMAND IS GENERATED BY SLAVE WITHIN PREDETERMINED PERIOD OF TIME IN RESPONSE TO STATUS REQUEST FROM MASTER, AND IS TO TRANSFER PRINTER STATUS, ERROR PRESENCE/ABSENCE ETC. SUBSEQUENTLY TO SLAVE'S ADDRESS |
| 05 | IMAGE TRANSFER END | THIS COMMAND IS GENERATED BY IMAGE TRANSFER ORIGIN AFTER IMAGE TRANSFER TERMINATES |
| 06 | PREVIEW START | THIS COMMAND IS GENERATED BY MASTER AND REPRESENTS MODE FOR CONTROLLING PREVIEW OPERATION ACCORDING TO PREVIEW CONTROL INSTRUCTION |

FIG. 24

PREVIEW CONTROL COMMANDS (EXAMPLE)

| CODE | COMMAND | CONTENTS |
|---|---|---|
| 21 | PREVIEW SETTING REQUEST | THIS COMMAND IS TO REQUEST SETTING OF PREVIEW CONTROL, AND SLAVE RETURNS SETTING SITUATION |
| 22 | PREVIEW PERMISSION | THIS COMMAND IS TO DESIGNATE PREVIEW DISPLAY ON/OFF |
| 23 | PREVIEW CLEAR | THIS COMMAND IS TO CLEAR PREVIEW IMAGE PLANE |
| 24 | PREVIEW KEY PERMISSION | THIS COMMAND IS TO DESIGNATE CONTROL OF CONSOLE PANEL IN CASE OF PREVIEW DISPLAY, AND TO INHIBIT/PERMIT PREDETERMINED KEY OPERATION |
| 25 | PREVIEW PPROCEDURE | THIS COMMAND IS TO DESIGNATE PREVIEW DISPLAY AND PRINT SEQUENCE PROCEDURE<br>(1) PREDETERMINED PREVIEW OPERATION IS PERFORMED IMMEDIATELY AFTER IMAGE TRANSFER TERMINATES. PRINT OPERATION IS NOT PERFORMED, BUT PRINT OPERATION STARTS WHEN NEW PRINT COMMAND IS GENERATED.<br>(2) PREDETERMINED PREVIEW OPERATION IS PERFORMED IMMEDIATELY AFTER IMAGE TRANSFER TERMINATES, AND ALSO PRINT OPERATION IS PERFORMED.<br>ETC. |
| 26 | PREVIEW IMAGE PROC | THIS COMMAND IS TO DESIGNATE IMAGE PROC / NO IMAGE PROC OF PREVIEW DISPLAY IMAGE (TO INSTRUCT PREDETERMINED IMAGE PROC / NO IMAGE PROC FOR TRANSFERRED IMAGE)<br>EX: IMAGE SYNTHESIS, COLOR CONVERSION, EDIT PROC, TONALITY CORRECTION ETC. |

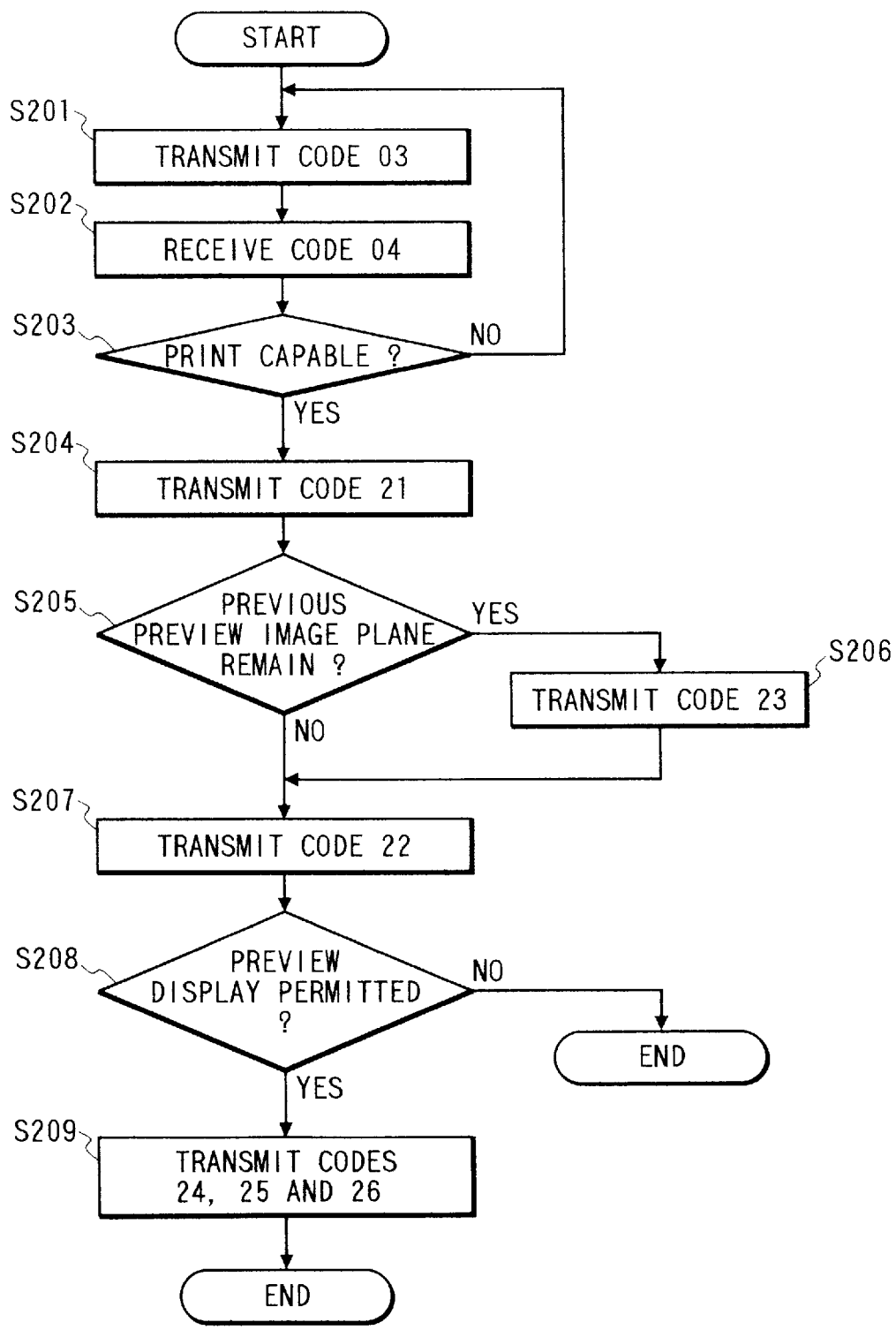

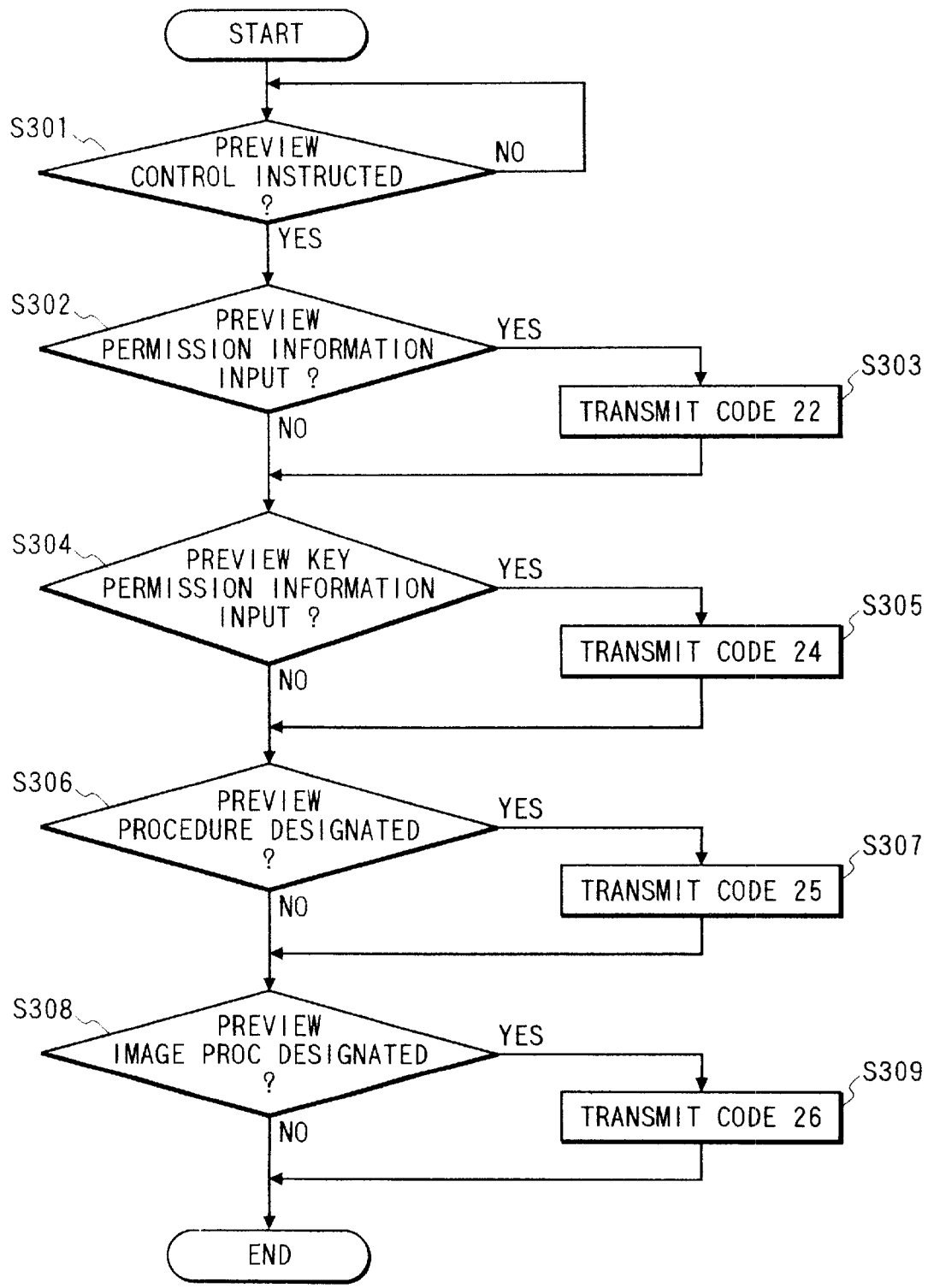

SYSTEM FOR IMAGE FORMATION AND IMAGE DISPLAY BASED ON AN EXTERNAL IMAGE SIGNAL

BACKGROUND OF THE INVENTION

1. Field of the Invention

The present invention relates to an image processing apparatus and a method therefor, for an image forming apparatus capable of preview image display.

2. Related Background Art

Owing to the recent progress in image quality and in functions, the digital color copying apparatus has become capable of considerably satisfying the expectations of the users in the color of the output image and the editing process therefor. Reflecting such situation, there is being commercialized the copying apparatus with so-called preview function, which allows the user to confirm the image on a monitor, instead of repeatedly forming the image on the recording sheet, for obtaining a desired output image.

Some of such copying apparatus employ a black-and-white liquid crystal display for displaying the image of the read original for the purpose of confirmation, but, if the copying apparatus is capable of color copying, the display device is preferably a full-color preview system since such black-and-white display does not allow confirmation of the color of the output image.

FIG. 1 shows the configuration of a conventional system of the kind mentioned above, wherein components 101 to 109 constitute a full-color copying apparatus while components 110, 111 and 219 constitute a preview system.

More specifically there are provided an RGB output sensor (CCD) 101 for reflectively reading the image of an original; an S/H (sample-hold) and A/D conversion circuit 102; a shading correction circuit 103; an input masking circuit 104; a logarithmic conversion circuit 105; a masking UCR circuit 106 for color matching with the characteristics of a printer unit to be explained later; an image editing circuit 107 for effecting trimming, masking painting, change in image magnification etc.; an edge enhancement circuit 108; and a printer unit (color laser beam printer) 109 for obtaining a full-color output image by scanning the unrepresented original 3 or 4 times.

There are further provided an image memory 110 for storing RGB image signals after masking in the input masking circuit 104; a memory control unit 111 for controlling the image memory 110 (by data exchange with the image memory 110 by means of an address counter and a CPU which are not shown); and a CRT 219 for displaying the information from the image memory. In this configuration, in a state in which the read image is merely displayed in full-color on the monitor, the displayed image does not reflect the result of any desired editing process applied from an unrepresented operation unit. Consequently the information stored in the image memory 110 is rendered arbitrarily accessible by an unrepresented CPU, and a final image is obtained by an editing software equivalent to the process in the editing circuit 107.

However, in such conventional color copying apparatus, if the image processing in the copying apparatus is entirely executed by a software process, there is required an enormous amount of software. Besides, an increase in the number of available functions results in an increase in the operation time with such software, thus becoming unbearable in time and in cost.

Also, though there have been proposed devices for displaying the image read from the original for the purpose of confirmation, such devices have been incapable of preview display of the image information supplied from an external equipment such as a host computer.

Also it has not been possible to control the function of the preview display means from an external equipment such as a host computer.

Also, in the course of a preview display of the image from the host computer, such preview display may be disturbed by a careless operation on the operation unit of the copying apparatus.

SUMMARY OF THE INVENTION

In consideration of the foregoing, an object of the present invention is to provide an image processing apparatus allowing satisfactory control of an image forming apparatus equipped with preview display means from an external equipment, and a method therefor.

The above-mentioned object can be attained, according to the present invention, by an image processing apparatus provided with:

reading means for reading an original and generating an image signal;

image forming means for forming an image on a recording medium, based on the image signal generated by the reading means; and display means for displaying the image to be formed by the image forming means, the apparatus further comprising:

input means for entering an image signal from an external equipment;

wherein the image forming means is rendered capable of image formation and the display means is rendered capable of image display, based on the image signal entered by the input means.

Also the present invention is featured by the presence of:

supply means for supplying an image signal from an external equipment to an image processing apparatus provided with reading means for reading an original and generating an image signal; image forming means for forming an image on a recording medium, based on the image signal generated by the reading means; and display means for displaying the image to be formed by the image forming means; and output means for outputting a control signal for controlling the display by the display means.

Another object of the present invention is to satisfactorily respond to preview control requests from plural control apparatus.

The above-mentioned object can be attained, according to the present invention, by an image processing apparatus provided with first supply means for supplying image forming means, capable of forming an image based on a given image signal on a recording medium, with such image signal, and second supply means for supplying display means, for displaying the image to be formed by the image forming means, with an image signal representing the image, the apparatus comprising a function to mediate among the instructions for effecting display on the display means from mutually different plural instruction means.

Still other objects of the present invention, and the features thereof, will become fully apparent from the following description to be taken in conjunction with the attached drawings and from the appended claims.

BRIEF DESCRIPTION OF THE DRAWINGS

FIG. 3 which is composed of FIGS. 3A and 3B are block diagrams of a digital image processing unit in the digital copying apparatus embodying the present invention;

FIG. 14 is a logic table for free color process;

FIG. 23 is a table showing examples of control command;

FIG. 24 is a table showing examples of preview command;

FIGS. 29, 30 and 31 are flow charts showing the sequence of preview control.

DESCRIPTION OF THE PREFERRED EMBODIMENTS

Now the present invention will be clarified in detail by preferred embodiments thereof, with reference to the attached drawings.

[Embodiment 1]

Figure 1:
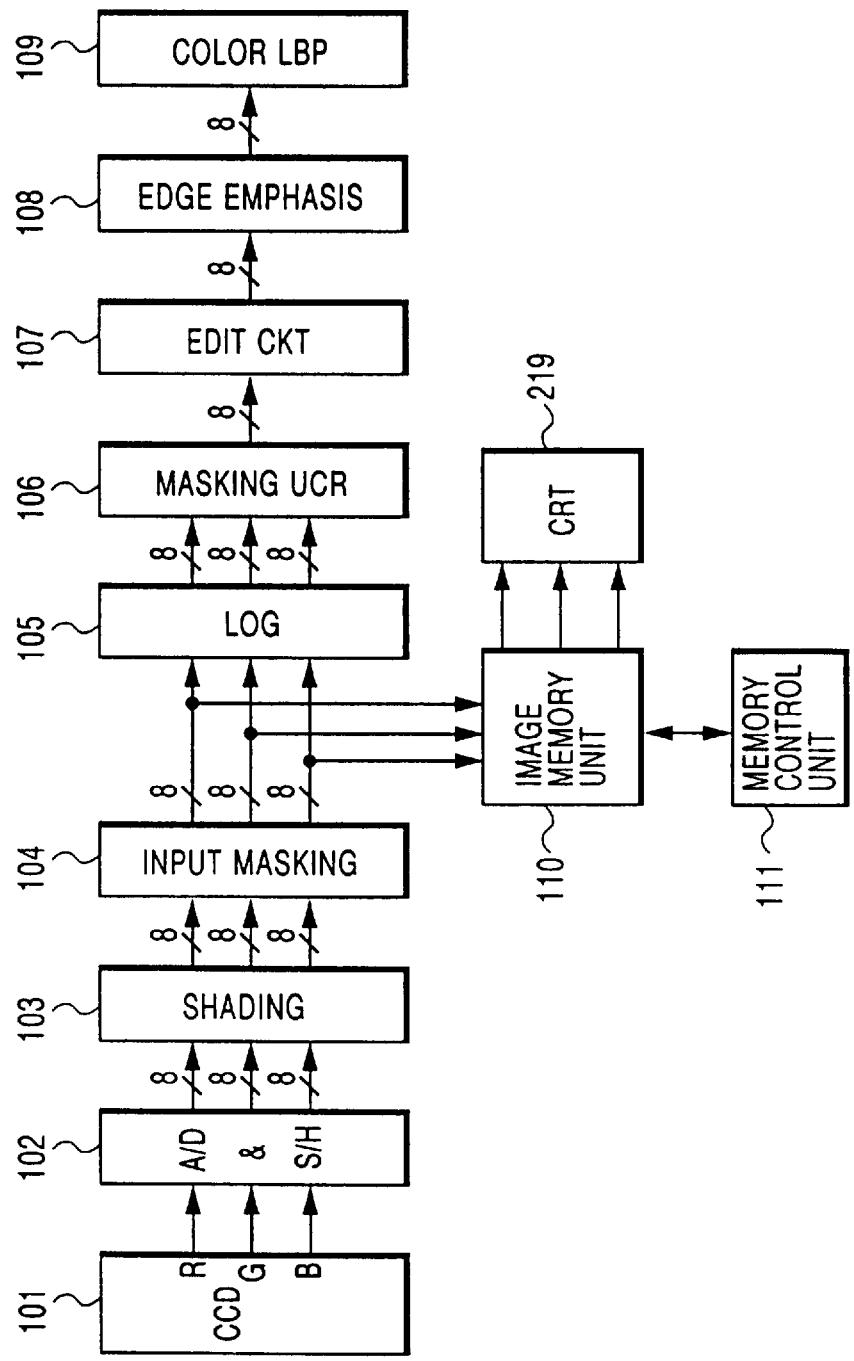
FIG. 1 is a block diagram showing an example of the configuration of the conventional system.
Figure 2:
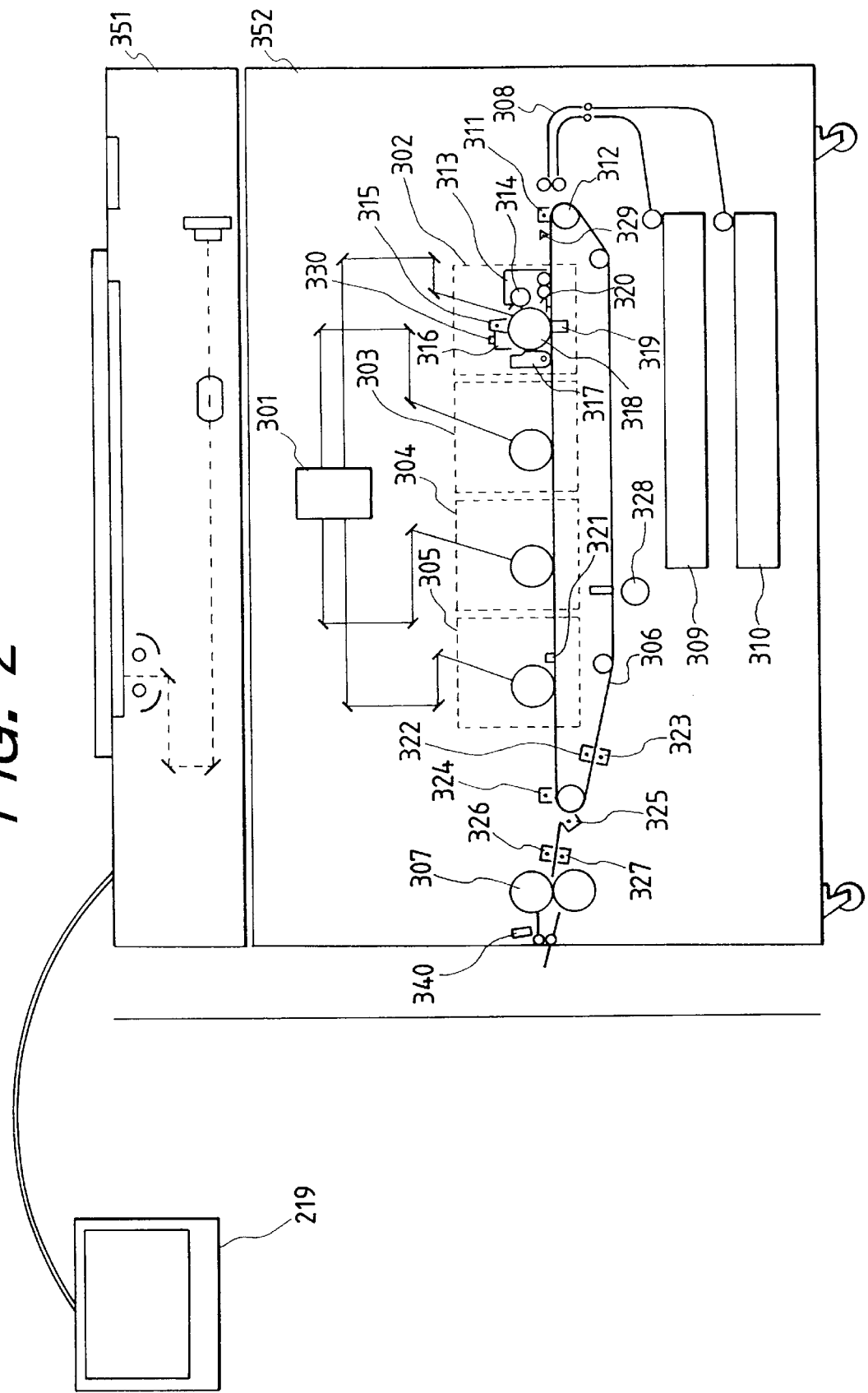
FIG. 2 is a schematic view of the internal structure of a digital copying apparatus embodying the present invention.

FIG. 2 is a view showing the internal structure of a digital copying apparatus constituting an embodiment of the present invention. The illustrated digital copying apparatus is divided into a color reader unit 351 for reading a color original and effecting digital editing process thereon, and a printer unit 352 provided with different image bearing members and adapted to reproduce a color image, based on the digital image signals of different colors supplied from the color reader unit 351.

A monitor 219 utilizes in the previewing operation is connected by a VGA interface with the main body of the digital copying apparatus.

(Configuration of the Reader Unit)

FIGS. 3A and 3B are block diagrams showing the configuration of a digital image processing unit of the color reader unit 351 in the digital copying apparatus embodying the present invention. A color original placed on an unrepresented original table is illuminated by an unrepresented halogen lamp. Thus, the image reflected from the original is taken by a CCD 201, and the obtained signals are subjected to sample holding and A/D conversion by a S/H (sample-hold) and A/D conversion unit 202 to generate three-color digital signals of red, green and blue.

The R, G, B color-separated data are subjected to shading correction and black correction in a shading correction unit 203, correction to NTSC signal in an input masking unit 204, and color conversion in a color conversion unit 205, and are then entered into a synthesis unit 206 which synthesizes the image data from the original with output data of an image memory 208.

The outputs of the synthesis unit 206 are subjected to logarithmic conversion in a logarithmic correction unit 207 thereby being converted into C, M, Y data. Subsequently a magnification varying (or zooming) unit 2 (234) effects a change in the image magnification, if such change in the image magnification is selected.

As the compression executed in an image memory 209 is irreversible and functions as a low-pass filter, an enlargement process is executed in this variation of the image magnification.

The outputs from the magnification varying unit 2 (234) are supplied to an image memory 208, which is composed of three components, i.e., a compression unit, an image memory unit and an expansion unit and from which there are read the CMY data (24 bits×4) prior to the output masking respectively corresponding to the four photosensitive drums mentioned above.

The compression unit converts the CMY data into luminance and color data such as L*a*b*, and effects irreversible encoding such as JPEG system or vector quantization. The image memory unit stores thus prepared encoded data of a block unit. The expansion unit, provided in four lines respectively corresponding to the four drums of M, C, Y, K, reads the encoded data in an arbitrary position of the image memory unit and executes decoding to the CMY data.

A masking UCR unit 212 generates the color signals respectively corresponding to the photosensitive drums and matching the characteristics of the printer. An editing circuit 213 effects an editing process on the YMCK color component data, such as a free color processor or a painting process. The data after the editing process are subjected to gamma correction in a gamma correction unit 214, a magnification varying process (more specifically a reduction process) in a magnification varying unit 1 (211), and an edge enhancement in an edge enhancement unit 215, and are then supplied to a color laser beam printer 216.

A preview process unit 217 is composed of a CRT image memory for storing the edited image data, and a memory control unit for controlling the above-mentioned CRT image memory. A CRT 219 serves to display the data of the above-mentioned CRT image memory. The details of the preview process unit 217 and the CRT 219 will be explained later.

An area generation unit 1 (220) processes a HSYNC signal 229 which is either a signal generated in the area generation unit 1 by a main scanning synchronization signal or a BD signal 228 supplied from the color laser beam printer (LBP) 216, an output signal DTOP 226 from an image top sensor, an ITOP signal 227 generated in the color LBP (utilized for generating sub scanning enable signals synchronized with the drums in the printing operation), seven signals 221 consisting of two write-in enable signals (a main scanning signal 221-1 and a sub scanning signal 221-2) and five read-out enable signals (a main scanning signal 221-3 and four sub-scanning signals 221-M, 221-C, 221-Y and 221-K), for controlling the image data in the image memory unit 208, seven signals 238 (a main scanning write-in enable signal 238-1, a sub scanning write-in enable signal 238-2, a main scanning read-out enable signal 238-3, and sub scanning read-out enable signals 238-M, 238-C, 238-Y, 238-K) generated in synchronization with the above-mentioned signal 227 and in consideration of the delays in the compression unit and the expansion unit of the image memory unit 208 for adjusting the timing of the image signals and the area signals, and enables signals 225 (a main scanning signal and a sub scanning signal) for the CRT image memory in the preview process unit 217. In the present embodiment, the control signal 221 for the externally entered image signals is generated, based on a sub scanning write-in enable signal 2536 supplied from an external equipment to be explained later.

An area generation unit 2 (230) generates area signals for each editing process. As will be explained later, the area generation unit 2 is composed of a bit map memory unit for storing the area signals and a bit map memory control unit for controlling the bit map memory unit. For example it can consist of an AGDC (advanced graphics display controller) of which the write-in operation is executed by a CPU and the readout operation is executed in synchronization with the DTOP signal 226 and the HSYNC signal 229 (in synchronization with the optically scanned original image data).

The area generation unit 2 generates a color conversion enable signal 222, an image synthesis enable signal 223-2, and a free color or painting enable signal 236.

An area memory unit 231, a delay line DL1 (232), a DL2 (233), a magnification varying unit 3 (235) and a DL3 (237) are timing adjustment circuits for synchronizing the image signals with the area signals.

More specifically:

DL1: delays the signal 232-2 by a period of the color conversion (to provide an output signal 223-1); the pixel delay being achieved by a D-type flip-flop (DF/F), while the line delay being achieved by a FIFO memory;

DL2: delays the signal 226 by a period of the masking UCR (to provide an output signal 224-2); the pixel delay being achieved by a D-type flip-flop (DF/F), while the line delay being achieved by a FIFO memory;

DL3: delays the signal 236 by a period corresponding to color conversion+image synthesis+logarithmic conversion; the pixel delay being achieved by a D-type flip-flop (DF/F), while the line delay being achieved by a FIFO memory; and Magnification varying unit: effects an enlargement process, identical with that in the magnification varying unit 2 (234), with a same delay.

Figure 8:
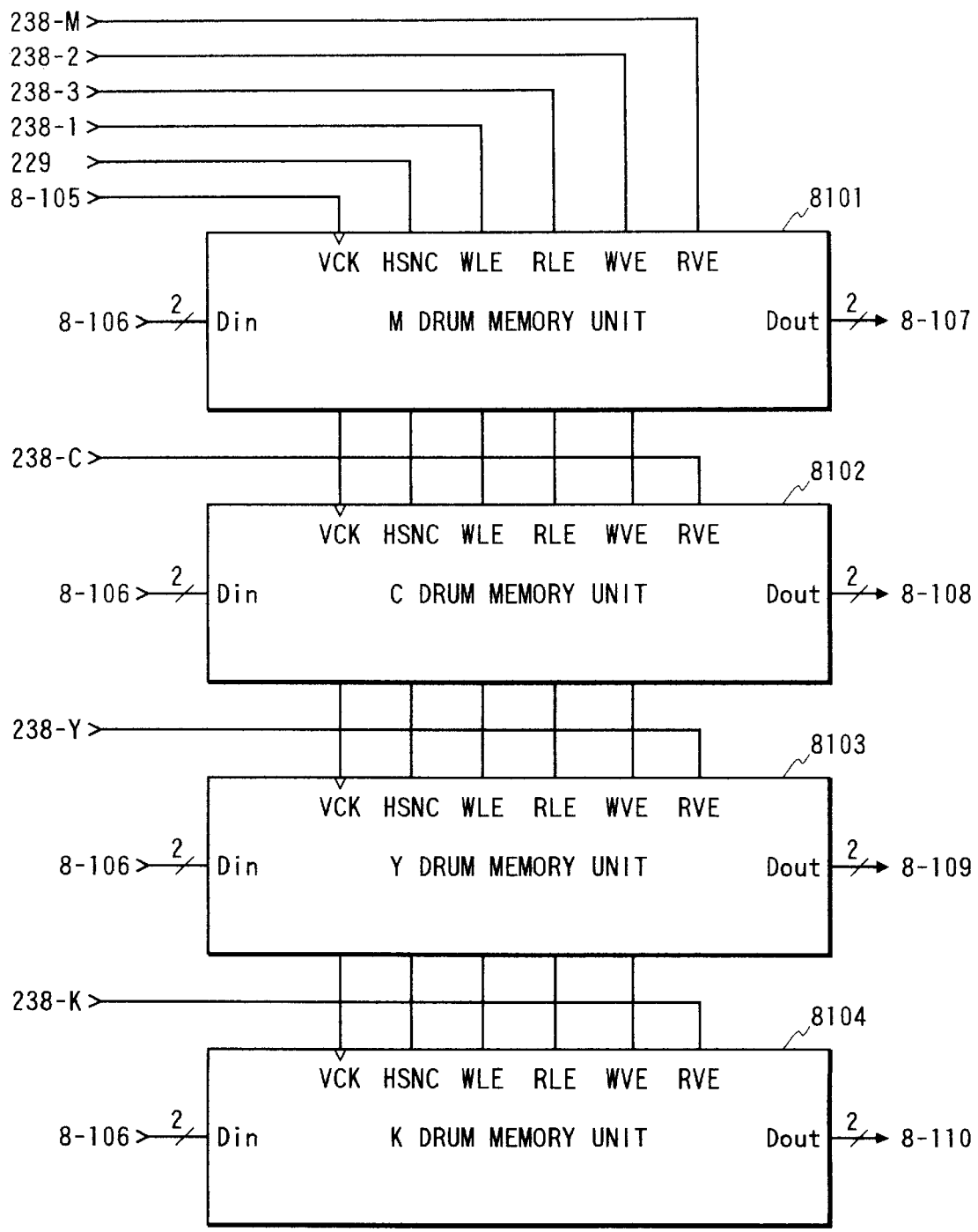
FIG. 8 is a block diagram showing the configuration of an area memory.

The area memory unit 231, for delay adjustment with the image memory unit 208, is composed of four memory units 810-1 to 810-4 which are mutually identical, as shown in FIG. 8, except for sub scanning read-out enable signals 238-M to 238-K corresponding to the drums of the respective colors.

Figure 9:
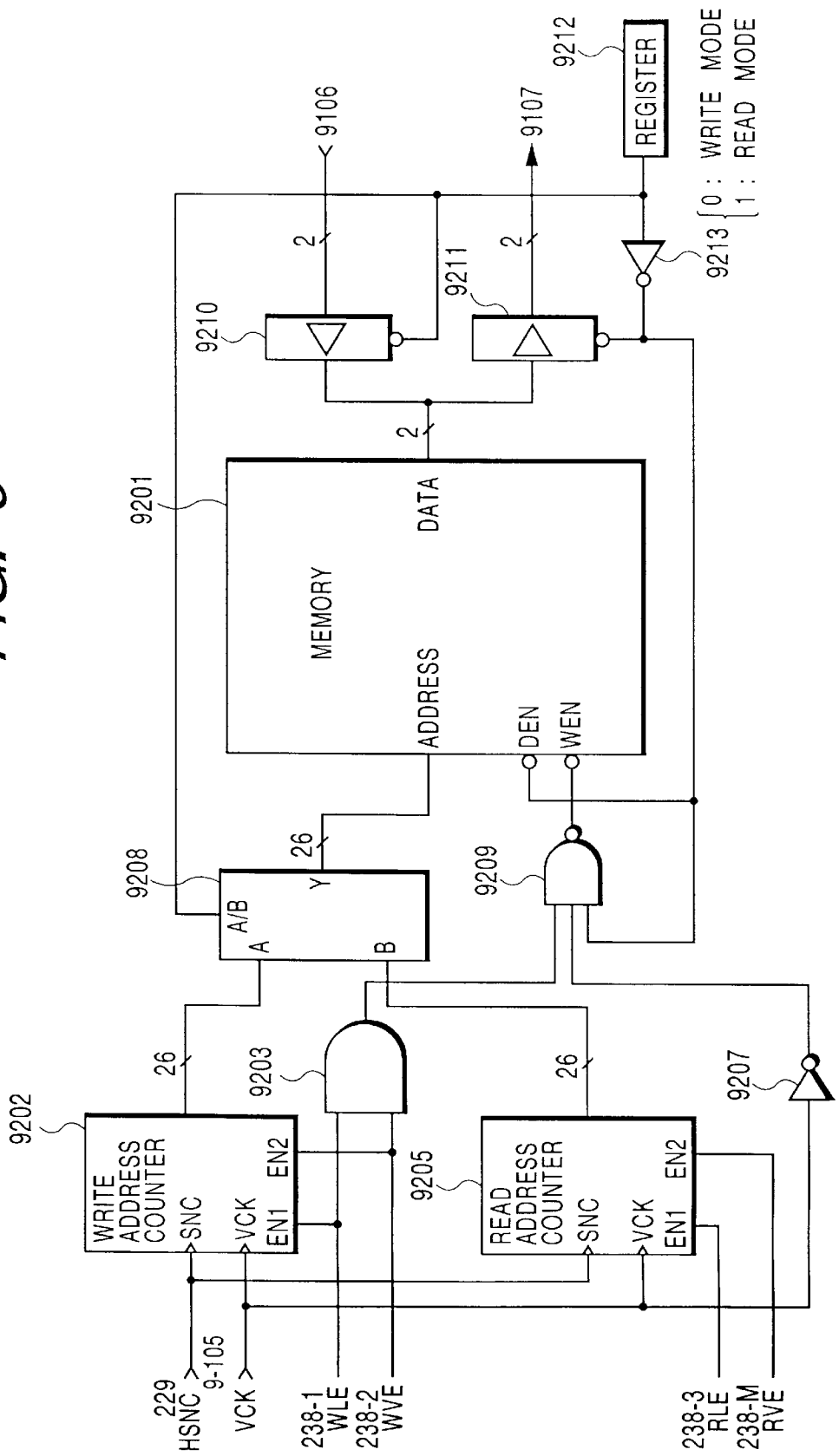
FIG. 9 is a block diagram showing the configuration of a memory for each color shown in FIG. 8.

As shown in FIG. 9, the memory unit of each color is composed of a memory 9201, a write address counter 9202 consisting of a main scanning counter which is reset at the upshift of a signal WLE 238-1 and effects an uncount when enabled and a sub scanning counter which is reset at the upshift of a signal WVE 238-2 and effects an upcount when enabled, a read address counter 9205 consisting of a main scanning counter which is reset at the upshift of a signal RLE 238-3 and effects an upcount when enabled and a sub scanning counter which is reset at the upshift of a signal RVE 238-M and effects an upcount when enabled, an AND gate 9203, an inverter 9213, buffers 9210, 9211 and a register 9212 designated by a CPU 240 shown in FIGS. 3A and 3B.

In the memory writing state:

register 9212: 0 address control: selected by the write address counter 9202 buffer 9210: enabled buffer 9211: disabled signal OEN: 1 signal WEN: 0 at the downshift of the clock signal whereby the data through the buffer 9210 are written into the memory 9201.

On the other hand, in the memory reading state:

register 9212: 1 address control: selected by the read address counter 9205 buffer 9210: disabled buffer 9211: enabled signal OEN: 0 signal WEN: 1 whereby the data of the memory 9201 are read through the buffer 9211.

The above-explained configuration allows to handle the area signals of respectively different timings as if they are on a same plane.

The CPU 240 exchanges the data with a program ROM 241 and a work RAM 242 through a CPU bus 243. The present image processing unit effects control such as data setting, similarly, through the CPU bus. The program ROM stores programs for the control to be executed by the CPU 240 in the present embodiment.

An interface 2001 in FIGS. 3A and 3B (hereinafter called external I/F) is provided for interfacing with a host computer 2006 and with external equipment such as a film scanner and a video camera.

In the present embodiment, there will be explained a case where the host computer 2006 sends image information to the copying apparatus through an image process controller 2007 which is normally provided therebetween, but it is naturally possible also to connect the host computer 2006 directly with the external I/F 2001 if the functions of the image process controller 2007 are incorporated in the copying apparatus.

The external I/F 2001 is composed of an image signal I/F (external video interface 2003-1 to 2003-3) for transmitting bidirectional RGB image signals of 8 bits each (24 bits in total), an image control signal I/F 2004-1 for transmitting image control signals such as an image clock signal VCLK, a main scanning synchronization signal HSYNC, a sub scanning synchronization signal VE, an image enable signal LE for each pixel etc., a communication I/F 2004-2 with four serial communication lines for controlling the controller 2007 and the entire copying apparatus, and ready signal I/F 2004-3 for indicating the operation enables state of the copying apparatus. The controller 2007 is an interface (image process controller) for connecting the main body of the digital copying apparatus with an ordinary computer 2006.

The serial communication lines are of a semi-duplex synchronized system consisting of a command signal CMD, a status signal STS, a status reception ready signal SRR, and a command reception ready signal CMD, and the baud rate and the data format are determined in advance at the start-up of the system.

(Explanation of Bus Selector)

Figure 25:
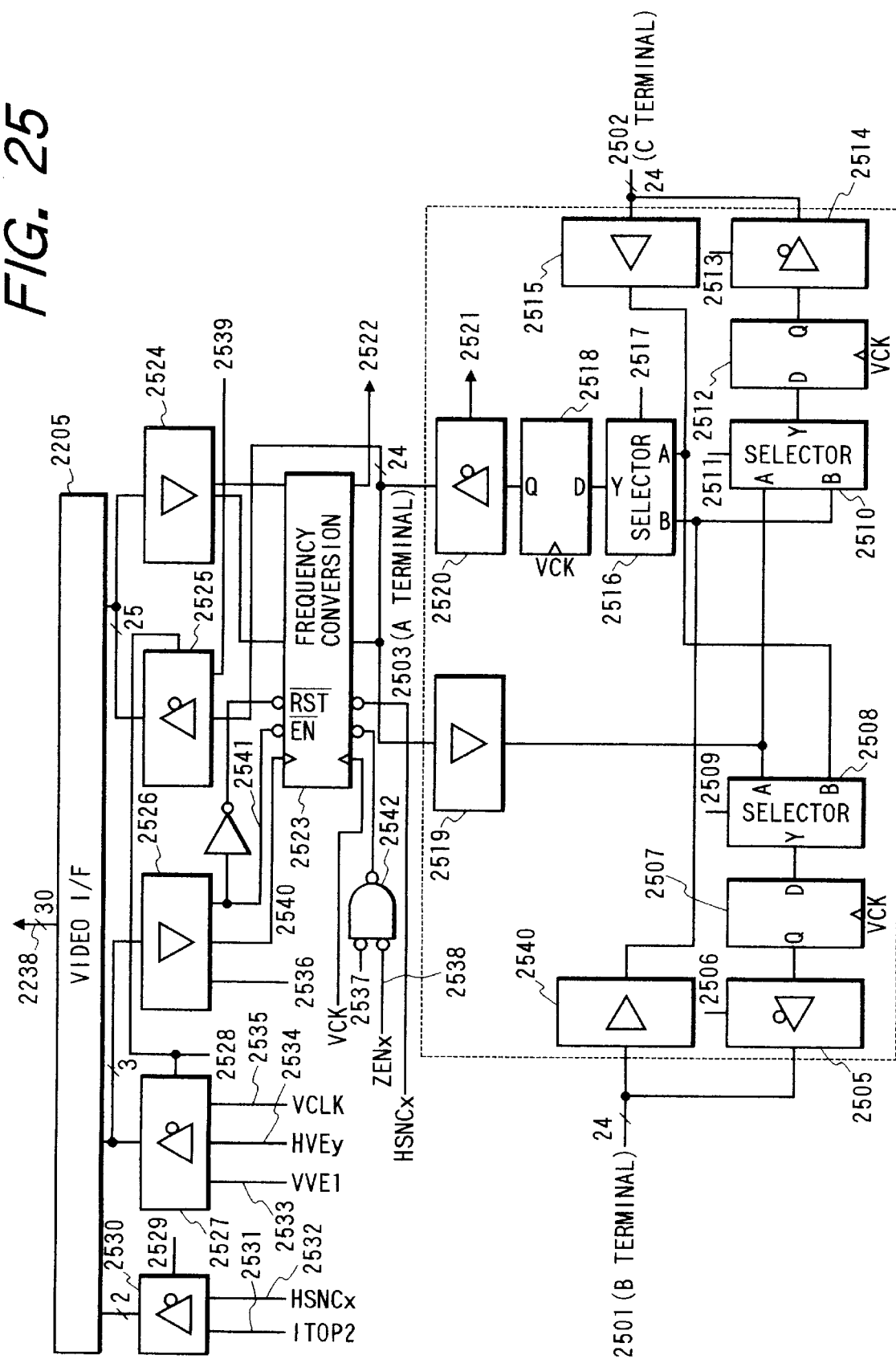
FIGS. 25 and 26 are circuit diagrams showing the configuration of an external interface 2001.

FIG. 25 is a block diagram of a video interface 2238 of the external I/F 2001 and the peripheral circuits.

It is composed of bidirectional buffers 2504, 2505; 2514, 2515; 2519, 2520; 2526, 2527; 2524, 2525; an output buffer 2530; signal lines 2506, 2513, 2521, 2528, 2529 for controlling the above-mentioned buffers by the CPU 240; a frequency conversion circuit (FIFO) 2523; a selector 2508 for selecting the input at a terminal A or C; a DF/F 2507 receiving the output of the selector 2508; a selector 2510 for selecting the input at a terminal A or C; a DF/F 2512 receiving the output of the selector 2510; a selector 2516 for selecting the input at a terminal B or C; a DF/F 2517 receiving the output of the selector 2516; and an OR gate 2542 constituting a 3-state output buffer for the sub scanning sync signal ITOP2 (2531) and the main scanning sync signal (2532).

There are also shown a sub scanning write enable signal VVE1 (2533) for another equipment (reader-printer); a sub scanning write enable signal 2536 from another equipment (master equipment); a main scanning enable signal 2534 for another equipment; a main scanning enable signal 2541 (low active) from another equipment, to be used as a write enable signal and, after inversion, as a write reset signal for the frequency converter 2523; a video clock signal 2535 in the apparatus and for other equipment; and a video clock signal 2540 from another equipment, to be used as a write clock signal for the frequency converter 2523. The main scanning sync signal 2532 is used, after inversion, as a read reset signal for the frequency converter 2523. There are also shown lines 2522, 2539 for transmission, to or from the outside, of the data of a binary bit map memory if such memory is provided in the apparatus; I/O ports 2529, 2528, 2547, 2506, 2509, 2511, 2513, 2521, 2517 to be set by the CPU 240, and a signal 2538 to be used as an enable signal for the frequency converter.

The B, C terminals 2501, 2502 respectively correspond to B1–B3, C1–C3 in the external I/F 2001 in FIG. 3A.

Figure 26:
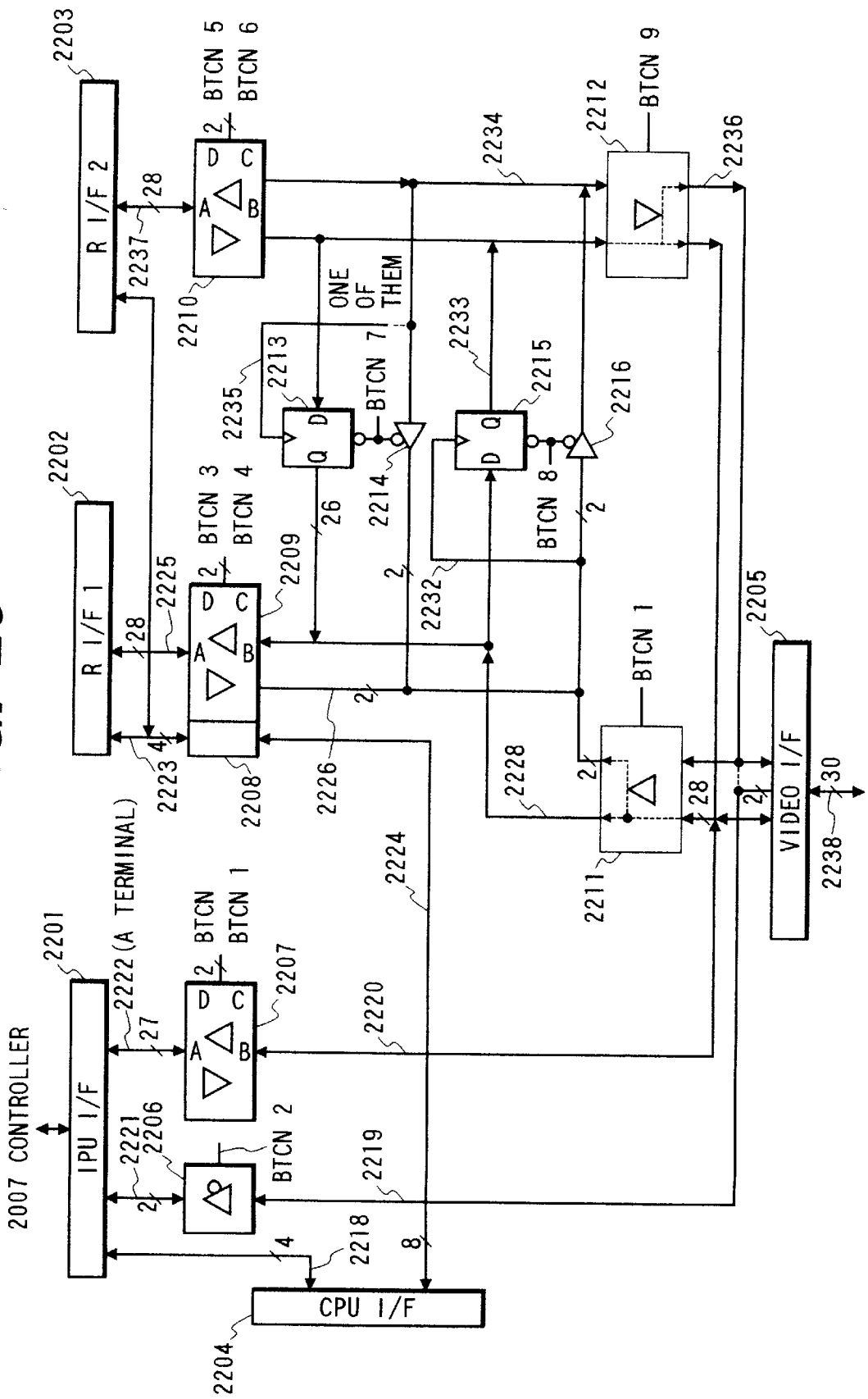
Figure 27:
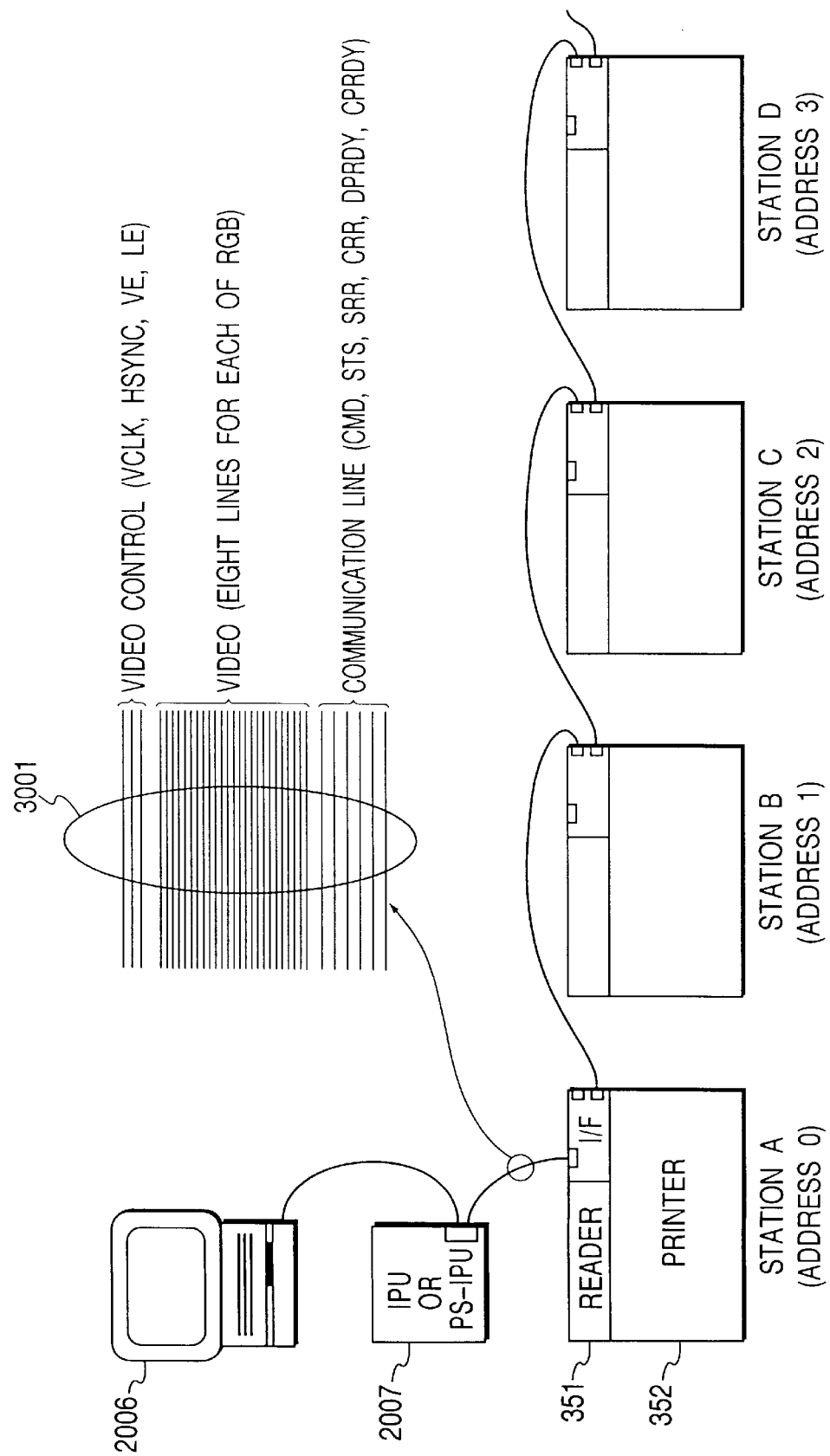
FIG. 27 is a view showing an example of serial connection.

The signal of the A terminal is connected with the external equipment (controller 2007), as 2003–⅓ of an IPU interface 2201 shown in FIG. 26, through a bidirectional video interface 2205. Though the details are omitted in the present embodiment, video interfaces 1 (2202), 2 (2203) are used for tandem connection of plural copying apparatus as shown in FIG. 27.

(Signal Flow in each Image Mode)

In the following there will be explained the flow of the video signal and the setting of the I/O ports in different modes, with reference to FIGS. 3A, 3B, 25 and 26.

{Case of a Reflective Original}

This is a case where the image data from the controller 2007 are not utilized. Consequently the preview operation is executed by a key operation from an operation unit 244 of the copying apparatus.

In this case, B1–B3, C1–C3 of the external I/F 2001 are set at the input mode by the CPU 240. Also the video selector and the I/O ports of the peripheral circuits are set in the following manner:

2506: high "1"
2509: X (arbitrary)
2511: X (arbitrary)
2513: high "1"
2517: X (arbitrary)
2521: X (arbitrary)
2528: high "1"
2529: high "1"
2537: high "1"

[Ordinary Copying Mode]

In the ordinary copying mode, the video signal flows in a path 201→202→203→204→205→206 (input at terminal A and output from terminal C) →207→234→208→212→213→214→211→215→216. In this state, the sub scanning enable signals 221-M, 221-C, 221-Y, 221-K and 238-M, 238-C, 238-Y, 238-K are so controlled as to assume the enabled state at timings corresponding to the distances of arrangement of the different color drums (color image forming units).

[Display on CRT 219 of the Result of RGB Editing Process (Color Conversion by Color Converter 205)]

In this case, the video signal flows in a path 201→202→203→204→205→206 (input at terminal A and output from terminal C) →207→234→208→212→213→214→211→215→217→219. In this case, the data stored in the image memory 208 vary each time the editing content (color conversion parameters in the color conversion unit 205) in the preview mode is changed, so that the process is executed from the original reading, for each display on the CRT 219, and the flow of the video signal is repeated from the CCD 201.

In this state, the sub scanning enable signals 221-M, 221-C, 221-Y, 221-K and 238-M, 238-C, 238-Y, 238-K are simultaneously upshifted and downshifted.

After the preview image is accepted, the printing operation is executed by the data readout from the image memory 208, without the optical scanning. In this state, the sub scanning enable signals 221-M, 221-C, 221-Y, 221-K are so controlled as to assume the enabled state with such timings corresponding to the distances of arrangement of the color drums.

[Display on CRT 219 of the Result of CMYK Editing Process (Painting Process or Free Color Process by Editing Circuit 213)]

In this case, the video signal flows along a path 201→202→203→204→205→206 (input at terminal A and output from terminal C) →207→234→208→212→213→214→211→215→217→219. In this case, the data stored in the image memory 208 are not influenced by the editing content in the preview mode, so that the display on the CRT 219 for the second or subsequent time is executed by the change of the editing parameters in the editing circuit 213 and the data readout from the image memory 208, without the optical scanning by the CCD 201. Thus, in the display of the second or subsequent time, the flow of the video signal starts from the image memory 208.

In this state, the sub scanning enable signals 221-M, 221-C, 221-Y, 221-K and 238-M, 238-C, 238-Y, 238-K are simultaneously upshifted and downshifted. After the preview image is accepted, the printing operation is executed by the data readout from the image memory 208, without the optical scanning. In this state, the sub scanning enable signals 221-M, 221-C, 221-Y, 221-K are so controlled as to assume the enabled state with such timings corresponding to the distances of arrangement of the color drums.

[Display on CRT 219 of the Result of Synthesis of Reflective Originals]

(1) In the first image writing, the video signal flows along a path 201→202→203→204→205→206 (input at terminal A and output from terminal C)→207→234→208.

(2) In the re-writing into the image memory 208 after synthesis with the second image:

(2-1) The video signal representing the first image, supplied from the image memory 208 flows along a path 208→212→213→211→215→206. In this process, the masking UCR unit 212 is in a through state, and an inverse LOG table is set in the gamma correction.

(2-2) The video signal from the reflective original flows along a path 201→202→203→204→205 →206.

(3) Synthesis and output on CRT

The signal flows along a path 206→207→208 (memory writing), and 208→212→213→214→211→215 →217→219 (CRT output).

{Input/Output with External Equipment (such as Host Computer 2006)}

[Output to External Interface 2001]

This mode is to fetch the original image data, read in the copying apparatus consisting of the color reader unit 351 and the printer unit 352, into the controller 2007.

(1) The video signal flows along a path 201→202→203→204→2001 (which is so set by the CPU 240 that the input at B is outputted at A) →2007→2006;

(2) The video selector and the I/O ports in the peripheral circuits are set in the following manner

2506: high "1"
2509: X (arbitrary)
2511: X (arbitrary)
2513: high "1"
2517: low "0"
2521: low "0"
2528: low "0"
2529: low "0"
2537: low "0"

[Input from External Interface 2001]
(Image Formation by the Printer 216, of the Image from the Ordinary Host Computer 2006)

1. Write-in into the Image Memory (1) The video signal flows along a path 2006→2007→2001 (which is so set by the CPU 240 that the input at A is outputted at C) →206 (which is so set by the CPU 240 that the input at B is outputted at C) →207→234→208.

In this operation, the signal 211 entered in the area generation unit is used as the sub scanning write enable for the memory 208. Also the terminal B of 2001 is set at the input state.

(2) The video selector and the I/O ports in the peripheral circuits are set in the following manner:

2506: low "0"
2509: X (arbitrary)
2511: high "1" (selecting side A)
2513: low "0"
2517: X (arbitrary)
2521: high "1"
2528: high "1"
2529: high "1"
2537: low "0"

2. Readout from the Image Memory 208

(1) The video signal flows along a path 208→212 →213→214→211→215→216.

In this operation, the signal 221 from the area generation unit is used as the read enable signal for the memory 208.

(2) The video selector and the I/O ports in the peripheral circuits are set in the same manner as in the ordinary copy mode (copying of reflective original). The terminals B1–B3, C1–C3 of the external interface 2001 are set at the input state for avoiding data collision.

[Display of Input from the External Interface 2001 on the CRT 219]
(Display of Image from the Original Host Computer 2006 on the CRT 219)

1. Write-in into the Image Memory 208

(1) The video signal flows along a path 2006→2007→2001 (which is so set by the CPU 240 that the input at A is outputted at C) →206 (which is so set that the input at B is outputted at C) →207→234→208 (memory writing).

The terminal B of the interface 2001 is set at the input state.

(2) The video selector and the I/O ports in the peripheral circuits are set in the same manner as in the case of input from the external interface 2001.

2. Output to the CRT 219

(1) The video signal flows along a path 208→212 →213→214→211→215→217→219.

In this operation, the signal 225 from the area generation unit 1 is used as the read enable signal for the memory 208.

(2) The video selector and the I/O ports in the peripheral circuits are set in the same manner as in the ordinary copy mode (copying of reflective original). The terminals B1–B3, C1–C3 of the external interface 2001 are set at the input state for avoiding data collision.

[Synthesized Print of the Image Read from a Reflective Original by the CCD 201 and the Input Image from the External Interface 2001]

1. Write-in into the Image Memory 208 of the input image (first image) from the external interface 2001

(1) Flow of the video signal is same as in the copy mode for the input image from the external interface 2001.

(2) The video selector and the I/O ports in the peripheral circuits are set in the same manner as in the copy mode for the input image from the external interface 2001.

2. Write-In into the image memory 208 of the image (second image) read from a reflective original by the CCD 201 (flow of video signal in synthesis with the second image and write-in again in the image memory 208)

(2-1) Readout from the image memory 208

(1) The video signal representing the first image flows along a path 208→212→213→214→211→215→206. In this process, the masking UCR unit 212 is in a through state, and an inverse LOG table is set in the gamma correction. In this manner the video data of RGB color components are supplied to the synthesis unit 206.

(2-2) Flow of video signal representing the second image (1) The video signal flows along a path 201→202 →203→204→205→206. The reading of the second image by the CCD 201 is conducted, based on a predetermined sync signal, in synchronization with the data readout from the image memory 208.

(2-3) Write-in of the synthesized image into the image memory 208

(1) The video signal flows along a path 206 (synthesized image) →207→234→208.

The video signal of the second image from the reflective original is supplied to the input port A of the synthesis unit 206, while the video signal of the first image entered in advance and supplied from the external interface 2001 is supplied to the input port B of the synthesis unit 206, which effects a predetermined synthesis process on the input images at the ports A and B and outputs the synthesized image at an output port C.

The synthesis is executed by fitting the second image in a predetermined area of the first image. In this operation, the area signal 223-2 from the area generation unit 2 (230) is supplied to the synthesis unit 206 through the delay line DL1 (232). The second image of the reflective originals is written into the pre-designated area of the first image, according to such area signal 223-2.

In the present embodiment, since the image data encoded in the unit of a block are stored in the image memory 208, the image synthesis is executed after the first image is read therefrom and the synthesized image is again stored therein. However, if each pixel is stored, the second image may be directly overwritten in the pre-designated area of the image memory 208, without reading the first image therefrom. Also the image synthesis may be achieved by synthesizing the first and second images in a predetermined ratio, as in so-called see-through synthesis.

(2) The video selector and the I/O ports in the peripheral circuits are set in the same manner as in the ordinary copy mode (copying of reflective original). The terminals B, C of the external interface 2001 are set at the input state.

3. Readout of the Synthesized Image from the Image Memory 208

(1) The video signal flows along a path 208→212 →213→214→211→215→216.

In this operation, the signal 221 from the area generation unit 1 is used as the read enable signal for the memory 208.

(2) The video selector and the I/O ports in the peripheral circuits are set in the same manner as in the ordinary copy mode (copying of reflective original). The ports B1–B3, C1–C3 of the external interface 2001 are set at the input state for avoiding data collision.

[Display of the Synthesized Image on the CRT 219]

The synthesized image is stored in the image memory in the same manner as in the synthesized copy mode of the image read from the reflective original and the input image from the external interface.

1. Output to the CRT 219

(1) The video signal of the synthesized image from the image memory 208 flows along a path 208→212 →213→214→211→215→217→219.

(2) The video selector and the I/O ports in the peripheral circuits are set in the same manner as in the ordinary copy mode (copying of reflective original). The ports B1–B3, C1–C3 of the external interface 2001 are set at the input state for avoiding data collision.

The flow of the video signal explained in the foregoing is controlled by the CPU 240, according to a program stored in the ROM 241.

In the following there will be explained the operations from the setting at the image editing to the print-out operation with the preview function.

At first there will be explained the flow of the entire process.

Figure 4:
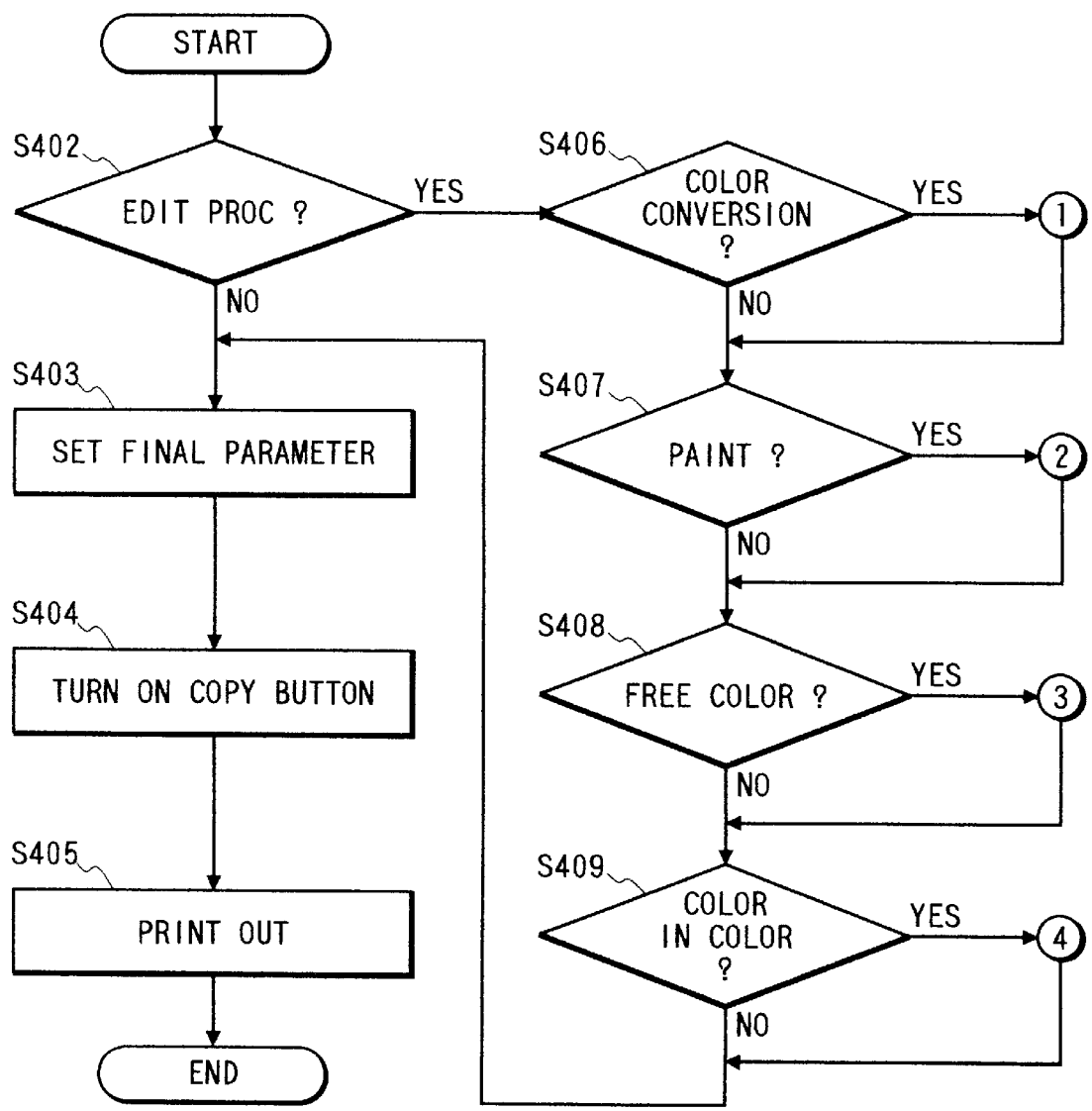
FIG. 4 is a flow chart showing the sequence of the entire image processing in an embodiment of the present invention.

FIG. 4 is a flow chart showing the sequence of the entire image processing of the present embodiment. As shown in FIG. 4, when an editing process is selected (step S402), for example by a color create key or a synthesis key, in the operation unit 244 of the digital copying apparatus shown in FIG. 15, there is selected at least one of a color conversion process (S406), a paint process (S407), a free color process (S408) and a color-in-color process (S409). The final parameters are determined, according to the intention of the operation, utilizing the preview function by the display on the CRT 219. The parameters are set in the process units in a step S403. Subsequently, in response to the actuation of a copy start button 50001 by the operation (S404), the final output is printed out (S405).

In the following there will be explained the sequence of each of the above-mentioned image processes.

1. Color Conversion Process

Figure 5:
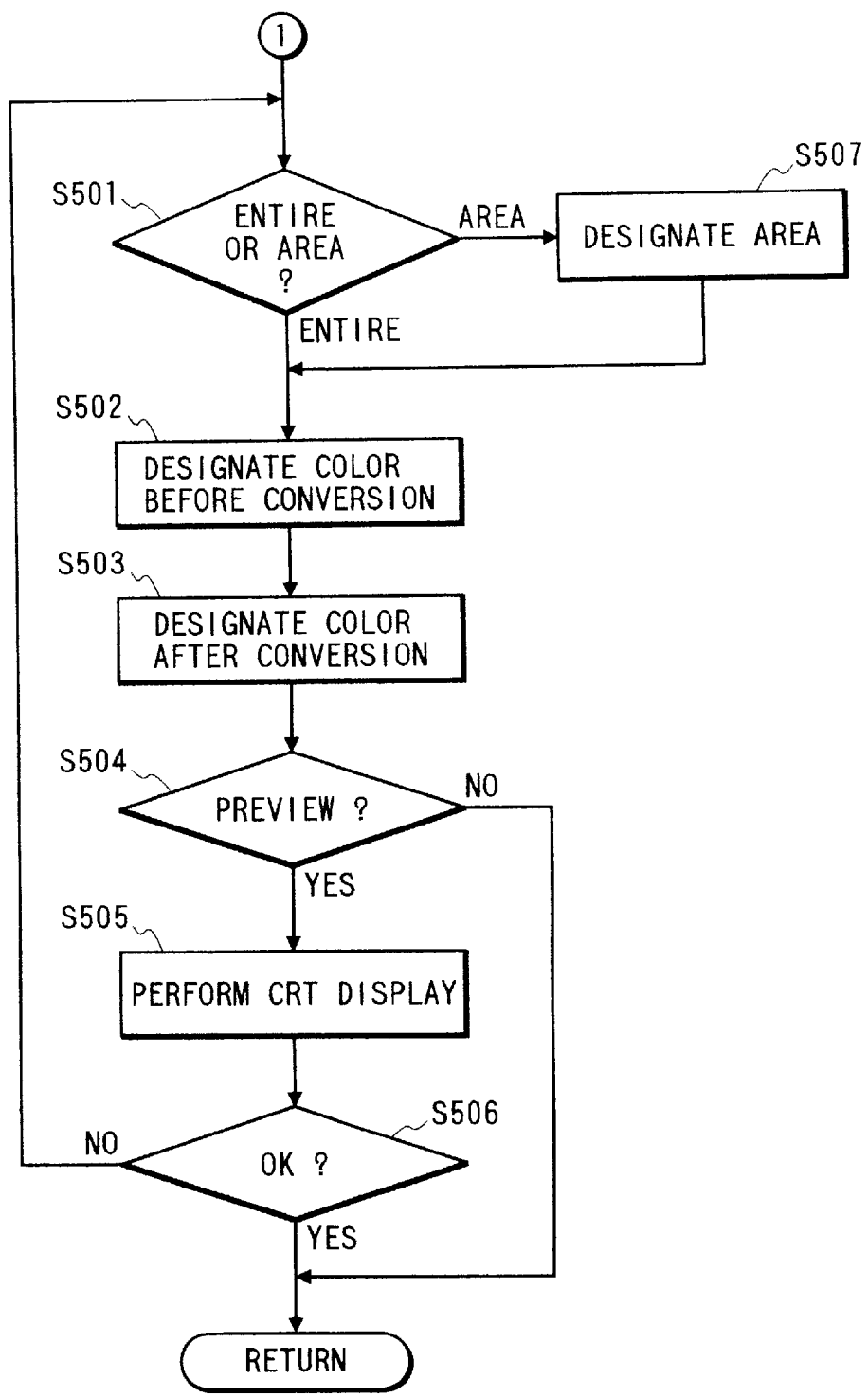
FIG. 5 is a flow chart showing the sequence of a color conversion process in an embodiment of the present invention.

FIG. 5 is a flow chart showing the sequence of color conversion. In this process, there is at first selected either entire color conversion or area color conversion (step S501), and, in case of the area color conversion, an area designation is in succession executed with area designation means such as an unrepresented digitizer (step S507). Then there are designated the color prior to conversion (S502) and the color after conversion (S503), and the parameters required for the color conversion are thus determined.

When the preview is selected in a step S504 (for example by a preview button shown in FIG. 15), the image reflected from the original placed on the unrepresented original table is read and is processed as explained in "display of the result of RGB editing on the CRT 219", whereby the image is displayed in a step S505 on the monitor 219.

If the result of display matches the intention of the operator, there is executed the setting of another editing process, or the setting of the final parameters and the print-out operation. If the result does not match the intention of the operator, the operator resets the parameters while watching the CRT 219, until the intention of the operator is satisfied (step S506).

2. Painting Process

Figure 6:
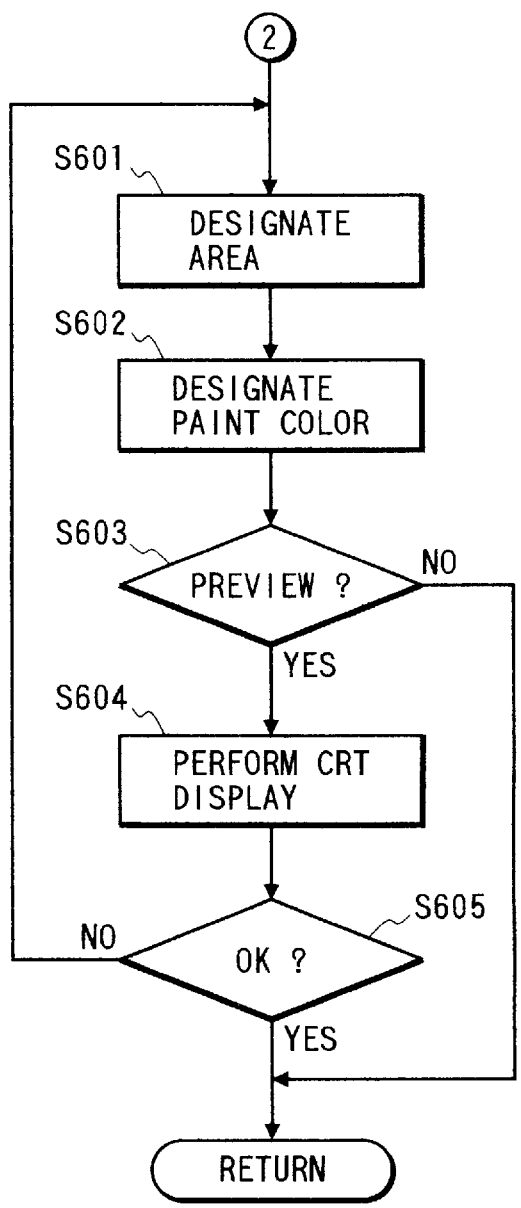
FIG. 6 is a flow chart showing the sequence of a painting process in an embodiment of the present invention.

FIG. 6 is a flow chart showing the sequence of the painting process. In this process, an area is set at first for example with the unrepresented digitizer (step S601), and the painting color is then set in a step S602. When the preview is selected in a step S603, the image reflected from the original placed on the unrepresented original table is read and is processed as explained in "display of the result of CMYK editing on the CRT 219", whereby the image is displayed in a step S604 on the monitor 219.

If the result of display matches the intention of the operator, there is executed the setting of another editing process, or the setting of the final parameters and the print-out operation. If the result does not match the intention of the operator, the operator resets the parameters while watching the CRT 219 (as explained in the foregoing, the second or subsequent display on the CRT 219 in the preview mode is achieved with the data read from the image memory 208), until the intention of the operator is satisfied (step S605).

As explained in the foregoing, the print-out operation is executed with the data read from the image memory 208.

3. Free Color Process

Figure 7:
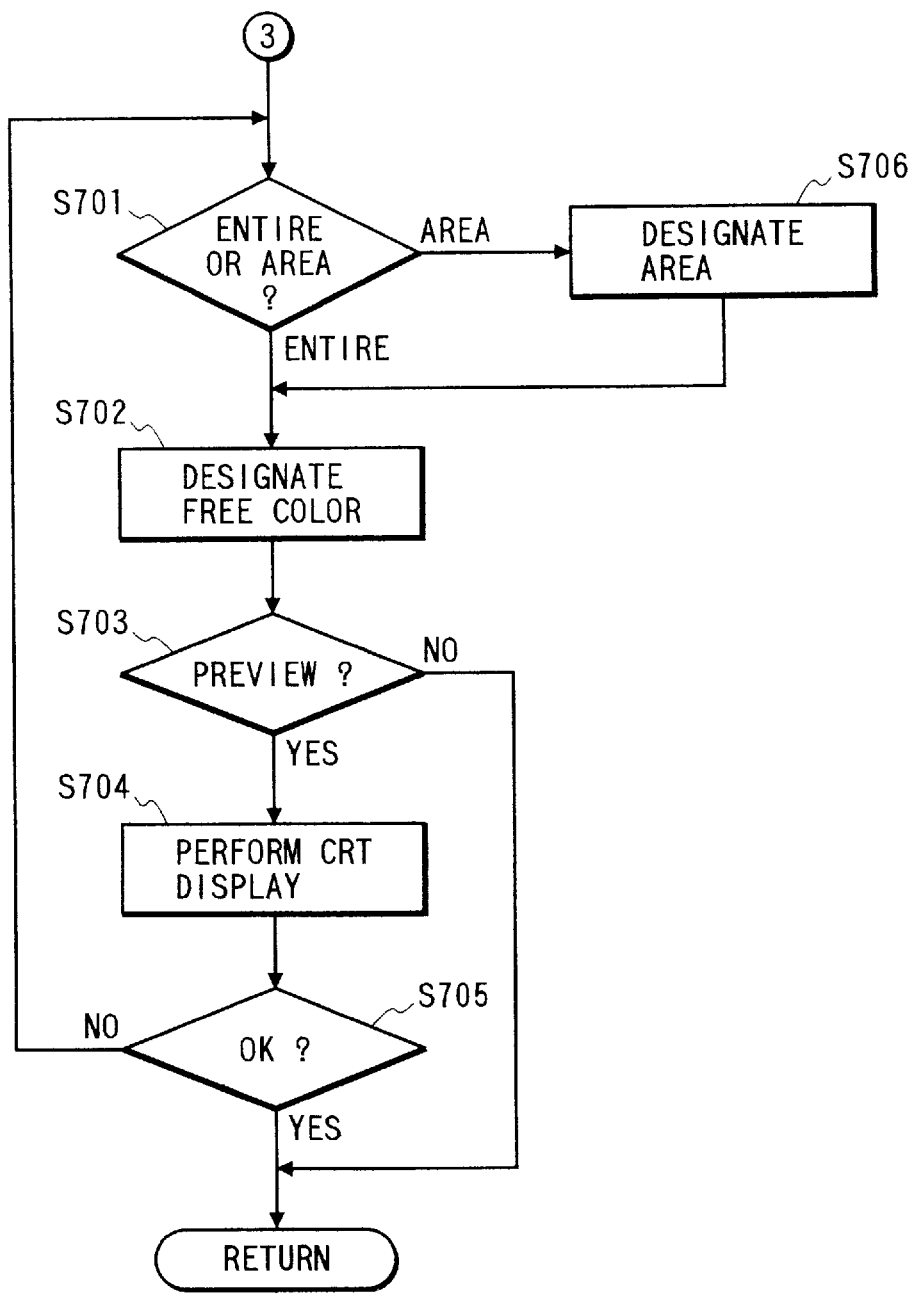
FIG. 7 is a flow chart showing the sequence of a free color process in an embodiment of the present invention.

FIG. 7 is a flow chart showing the sequence of the free color process (for converting the original image into a single color, while conserving the gradation of the original image). In this process, there is at first selected an entire mode or an area mode (step S701), and, if the area mode is selected, an area is then set for example with the unrepresented digitizer (step S706). Also a step S702 designates the color of the free color mode.

Then, when the preview is selected in a step S703, the image reflected from the original placed on the unrepresented original table is read and is processed as explained in "display of the result of CMYK editing on the CRT 219", whereby the image is displayed in a step S704 on the monitor 219.

If the result of display matches the intention of the operator, there is executed the setting of another editing process, or the setting of the final parameters and the print-out operation. If the result does not match the intention of the operator, the operator resets the parameters while watching the CRT 219 (as explained in the foregoing, the second or subsequent display on the CRT 219 in the preview mode is achieved with the data read from the image memory 208), until the intention of d the operator is satisfied (step S705).

As explained in the foregoing, the print-out operation is executed with the data read from the image memory 208.

4. Memory Synthesis Process

In the memory synthesis process, a first original is at first read by the CCD 201 and is stored in the image memory 208. Then an area for a second original to be synthesized is set with the unrepresented digitizer, and the image data stored in the image memory 208 and the image data of the second original are synthesized according to the information of the designated area and stored again in the image memory 208, by a read-modify-write operation. When the preview is selected, the data are read and displayed on the CRT 219. If the result of display matches the intention of the operator, there is executed the setting of another editing process, or the setting of the final parameters (area information). If the result does not match the intention of the operator, the operator resets the area information until the intention of the operator is satisfied.

In the foregoing there has been explained a case where the images to be synthesized are both read by the CCD 201, but the first image may be replaced by an image supplied from the external interface 2001.

(Configuration of Printer Unit)

In the following there will be explained the configuration of the printer unit in the digital copying apparatus of the present embodiment.

Referring to FIGS. 3A and 3B, there are shown a polygon scanner 301 for scanning a photosensitive drum with a laser beam; an initial image forming unit 302 for magenta (M) color; and image forming units 303, 304, 305 of a similar configuration respectively for cyan (C), yellow (Y) and black (K) colors.

The polygon scanner 301 scans the photosensitive drums of the respective colors with the laser beams coming from laser elements which are independently controlled for the M, C, Y and K colors by an unrepresented laser drive unit. Detection means BD detects the scanning laser beams to generate the main scanning sync signal. In case two polygon mirrors are provided on a same shaft and rotated by a same motor, the main scanning direction becomes opposite for example for the laser beams for the M and C colors and those for the Y and K colors. For this reason, with respect to the M and C images, the Y and K images are usually formed as mirror images in the main scanning direction.

In the image forming unit 302, there are provided a photosensitive drum 318 for forming a latent image by exposure to the laser beam, and a developing unit 313 for effecting toner development on the photosensitive drum 318. In the developing unit 313 there is provided a sleeve 314 for effecting toner development under the application of a developing bias voltage.

There are also provided a primary charger 315 for charging the photosensitive drum 318 to a desired potential; a cleaner 317 for cleaning the surface of the photosensitive drum 318 after the image transfer; an auxiliary charger 316 for eliminating the charge from the surface of the photosensitive drum 318 after cleaning with the cleaner 317, thereby ensuring satisfactory charging by the primary charger 315; a pre-exposure lamp 330 for eliminating the retentive charge on the photosensitive drum 318; and a transfer charger 319 for effecting discharge from the rear face of a transfer belt 306; thereby transferring the toner image from the photosensitive drum 313 onto a transfer material.

There are further provided cassettes 309, 310 containing the transfer materials; a paper feed unit 308 for feeding the transfer material from the cassettes 309, 310; an attraction charger 311 for attracting the transfer material fed from the paper feed unit 308; and a transfer belt roller 312 for rotating the transfer belt 306 and attracting the transfer material onto the transfer belt 306 in cooperation with the attraction charger.

There are further provided a charge eliminating charger 324 for facilitating the separation of the transfer material from the transfer belt 305; a peeling charger 325 for avoiding the distortion in the image, caused by the peeling discharge at the separation of the transfer material from the transfer belt; prefixing chargers 326, 327 for increasing the attractive force of the toner on the transfer material after separation, thereby preventing the distortion in the image; and transfer belt charge-eliminating chargers 322, 323 for eliminating the charge of the transfer belt 306, thereby electrostatically initializing the same.

There are further provided a belt cleaner 328 for removing the smear from the transfer belt 306; a fixing unit 307 for thermally fixing the toner image on the transfer material which has been separated from the transfer belt 306 and recharged by the pre-fixing chargers 326, 327; a sheet discharge sensor 340 for detecting the transfer material on a path through the fixing unit 307; and a front end sensor 329 for detecting the front end of the transfer material fed onto the transfer belt 306 by the paper feed unit 308. The detection signal from the front end sensor 329 is supplied from the printer unit to the reader unit, and is used for generating the sub scanning sync signal for the video signal transmission from the reader unit to the printer unit.

In the following there will be explained the circuit blocks in the reader unit, in the order of the preview process unit, the color conversion unit, the painting unit and the free color process unit.

(Preview Process Unit)

Figure 10:
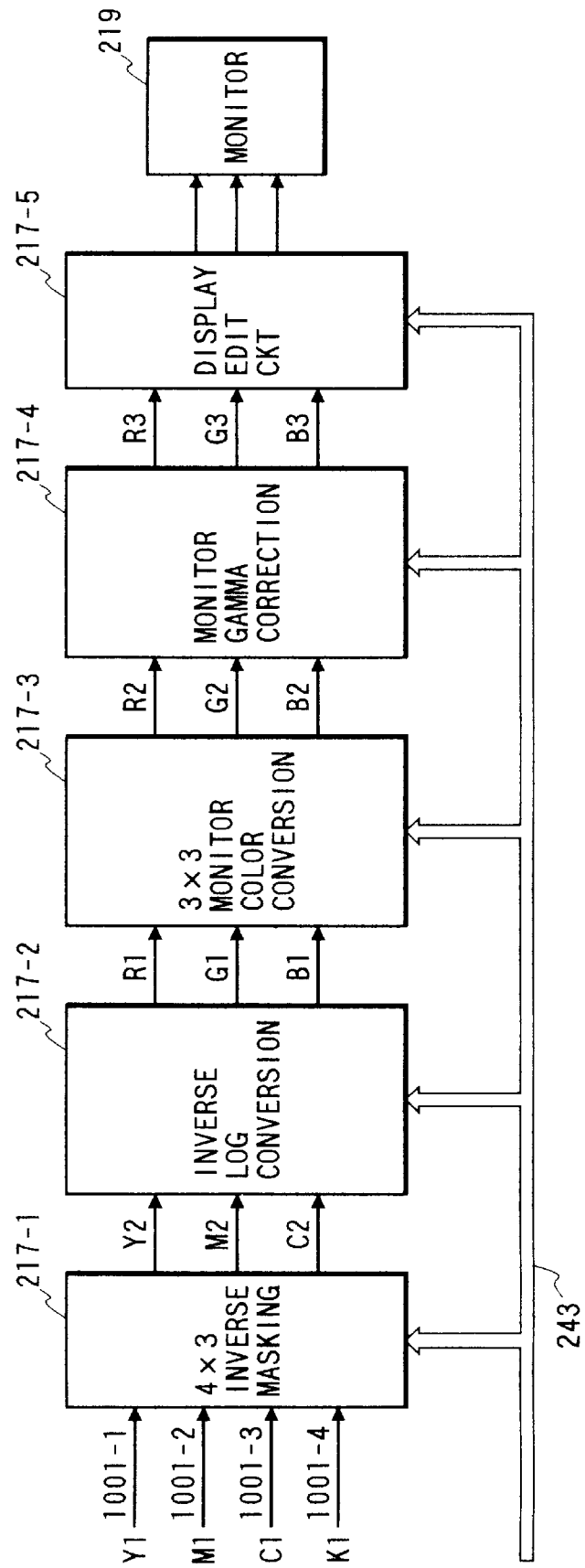
FIG. 10 is a block diagram of a preview process circuit for displaying the final image on the CRT.

FIG. 10 is a block diagram of a preview process unit 217, for displaying, on the CRT 219 shown in FIGS. 3A and 3B, the final image obtained from the read image data through all the process circuits.

The final image data Y1, M1, C1, K1 (1001-1–1001-4; 8 bits each) are at first supplied to a 4×3 inverse masking circuit 217-1 in the preview process unit, and are used in the following calculation, which is inverse to the calculation in the masking UCR circuit 212 shown in FIGS. 3A and 3B:

$$Y2 = a11^*Y1 + a12^*M1 + a13^*C1 + a14^*K1$$

$$M2 = a21^*Y1 + a22^*M1 + a23^*C1 + a24^*K1$$

$$C2 = a31^*Y1 + a32^*M1 + a33^*C1 + a34^*K1$$

The coefficients a11–a34 can be arbitrarily set by the CPU 240, through the CPU bus 243.

In this inverse masking circuit 217-1, the 4-color information is converted into 3-color information Y2, M2, C2, and the signals after conversion are supplied to an inverse logarithmic conversion circuit 217-2, which is composed of an LUT for effecting a calculation inverse to that in the LOG process unit 207 shown in FIGS. 3A and 3B, and in which correction data can be arbitrarily set by the CPU 240.

Through such inverse calculation, the YMCK density data are converted into luminance data usable for display on the CRT or the like. However, since the actually connected CRT may vary in its kind and in the color reproduction range, there is required means for adjusting such properties.

A next 3×3 monitor color correction unit 217-3 effects correction of the color characteristics of the monitor 219, according to the following equations:

$$R2=b11*R1+b12*G1+b13*B1$$

$$G2=b21*R1+b22*G1+b23*B1$$

$$B2=b31*R1+b32*G1+b33*B1$$

As in the foregoing inverse masking circuit 217-1, the coefficients can be arbitrarily set by the CPU 240.

A monitor gamma correction unit 217-4 effects correction of the gamma characteristics of the monitor 219, and arbitrary correction data can be set by the CPU 240. A display editing circuit 217-5 is provided for effecting various editing processes and controlling the monitor 219, at the display operation thereon.

Figure 11:
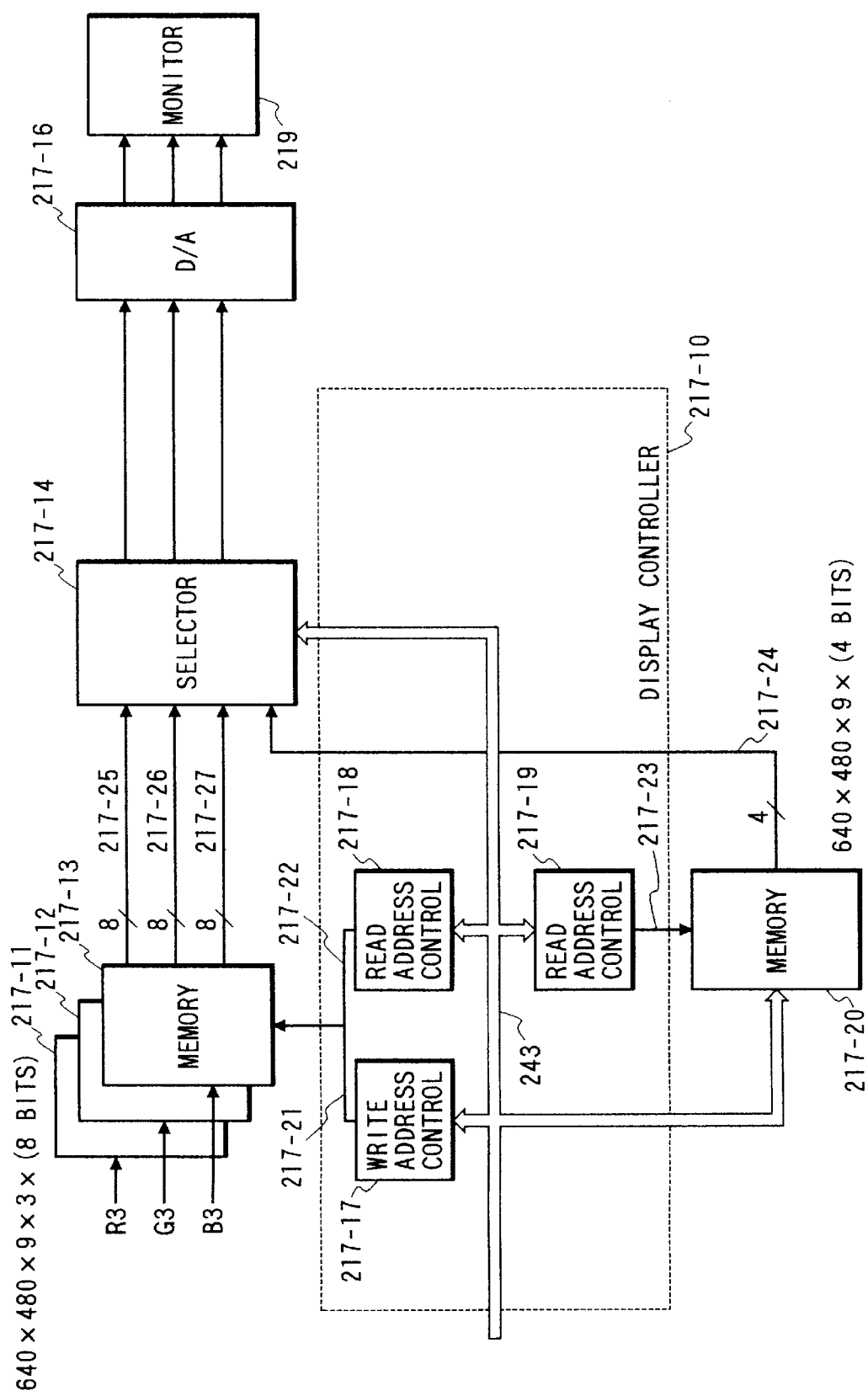
FIG. 11 is a detailed block diagram of a display editing circuit.

FIG. 11 is a detailed block diagram of the above-mentioned display editing circuit, which is principally composed of a portion for processing the read image and a portion for generating additional information such as a frame or a character in the above-mentioned image.

The data R3, G3, B3 after the foregoing gamma correction are respectively supplied to memories 217-11, 217-12, 217-13, and a start address and an end address in the X and Y directions can be set through the CPU bus 243, in order to enable the write-in operation at an arbitrary position of the memory, by an address 217-21 from a write-in address control circuit 217-17 in a display controller 217-10. In the present embodiment, these memories have a size of 640× 480×9× (8 bits)×(3 colors).

In the data writing, a reduced writing is possible depending on the original image size, and the image magnification can be set by the CPU 240. Also the image can be arbitrarily rotated by the write-in address control unit 217-17, depending upon whether the display image size is vertically or horizontally oblong.

In the area outside the start and end addresses, where the image is not stored, there may remain a previously stored image or the display color may become fixed. For this reason, the display in such area outside the data writing area can be made with an arbitrary color, set by the CPU 240.

After the data storage in the memories, an arbitrary coordinate is designated by the CPU 240 in an readout address control unit 217-18, in order to designate the area of the memory for reading the data for display on the monitor. In this embodiment, the display and the designation can be made on real-time basis, by soft keys on a touch panel display of the operation unit 244 to be explained later.

As the monitor of the digital copying apparatus of the present embodiment has an image size of 640×480 dots, the image data have to be skipped in order to display the content of the entire memory, and the rate of such data skipping can be set by the CPU 240. In the present embodiment, as will be explained later, there can be selected a 1×mode for displaying the entire memory, a 2×mode for displaying ⅙ of the memory and a 3×mode for displaying ⅑ of the memory.

A memory 217-20 is used for adding various patterns and characters to the image information, and has a size of 640×480×9× (4 bits). Thus, 4 planes of patterns and/or characters can be developed independently.

In the present embodiment, such information is directly developed on the memory by the CPU 240, but such development may also be achieved through an exclusive controller such as AGDC.

A readout address control unit 217-19 can set the readout start position and the data skipping rate; as in the readout address control unit 217-18.

The data read from the memories are supplied to a selector 217-14, which releases, according to the signal read from the memory 217-20, the image data 217-25 to 217-27 if the signal 217-24 is "L", or the RGB data (8 bits) of four planes if the signal 217-24 is "H".

These RGB data can be arbitrarily set by the CPU 240 for arbitrarily coloring the patterns and characters drawn on these 4 planes. The signal processed by the selector 217-14 is converted in a D/A converter 217-16 into an analog signal for the monitor, whereby the final image is displayed on the monitor 219.

(Color Conversion)

Figure 12:
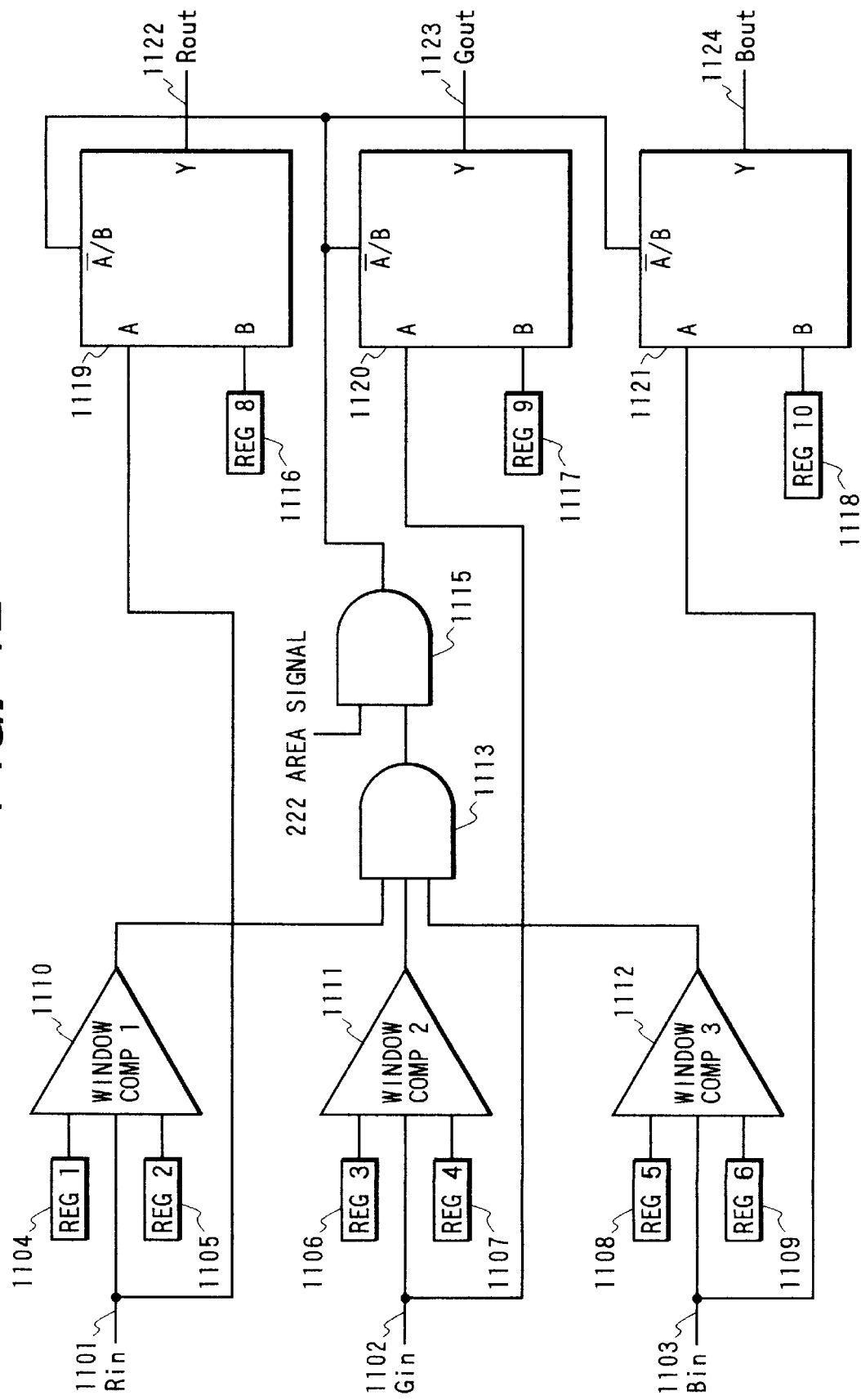
FIG. 12 is a circuit diagram of a color conversion unit.

FIG. 12 is a block diagram of a color conversion unit of the present embodiment, which can be divided into a detection unit and a conversion unit.

The detection unit is composed of three window comparators 1110, 1111, 1112, two AND gates 1113, 1115 and registers reg1–reg6 (1104–1109) for controlling these comparators and gates. These registers are set by the CPU 240 shown in FIGS. 3A and 3B, and function in such a manner that the outputs of the window comparators and the AND gates assume the level "1" to detect a characteristic color (however the area signal 212 being "1") when following conditions are met:

reg1≦input video Rin (1101)≦reg2 reg3≦input video Gin (1102)≦reg4 reg5≦input video Bin (1103)≦reg6.

On the other hand, the conversion unit is composed of three selectors 1119, 1120, 1121 and registers reg8–reg10 (1116–1118). When the AND gate 1115 provides an output "1", there is released the converted color represented by the values of the registers 1116–1118 set by the CPU 240, but, when the AND gate 1115 provides an output "0", the input video signals 1101–1103 are released as Rout, Gout and Bout (1122–1124).

(Painting and Free Color Process Circuits)

Figure 13:
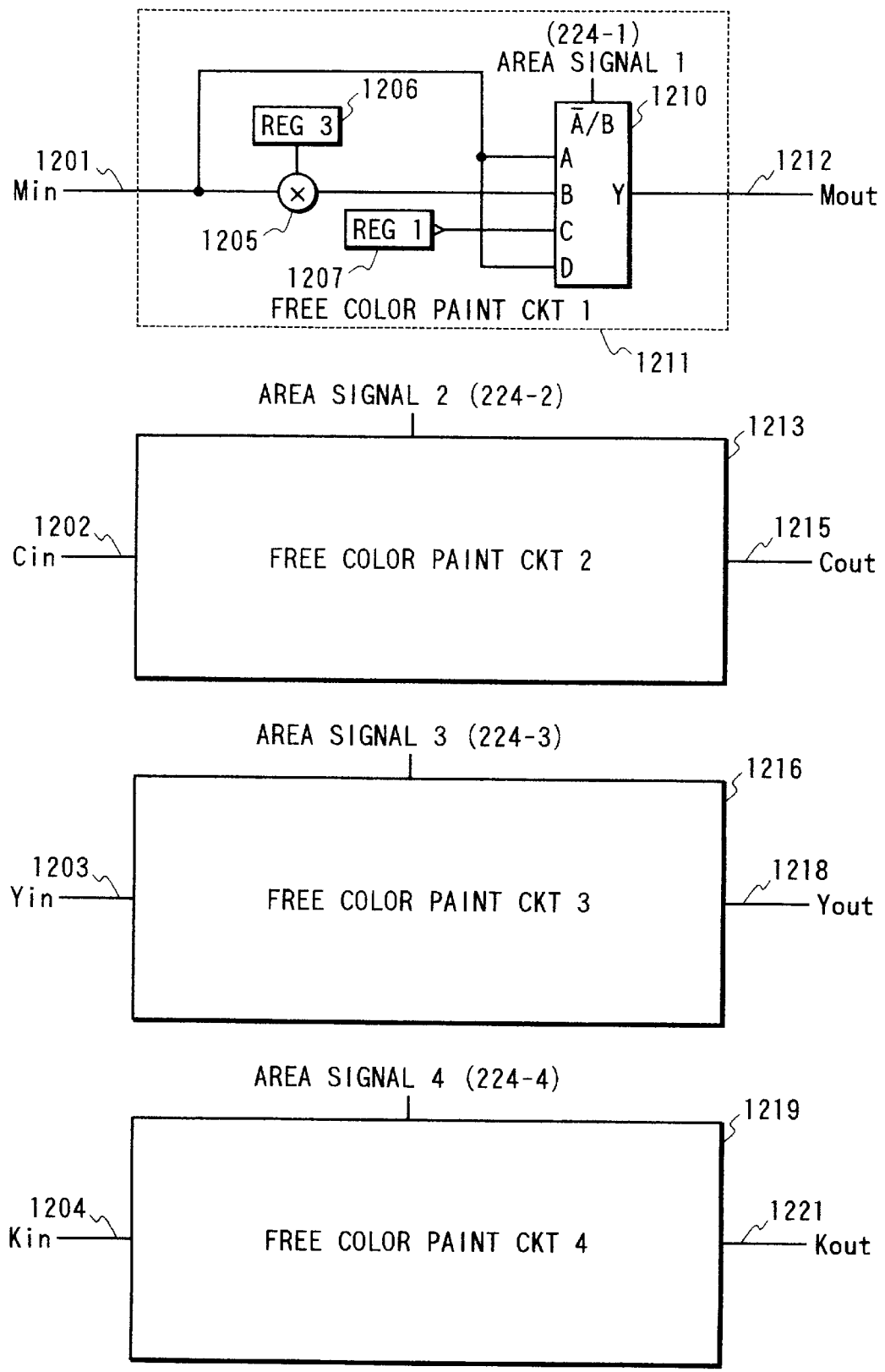
FIG. 13 is a circuit diagram for free painting process.

FIG. 13 is a block diagram of a circuit for the free color painting process in the present embodiment. The internal structure of the circuit is shown only for the magenta color, as it is same for all the colors.

The free color paint circuit 1 (1211) for the video signal of a color is composed of a multiplier 1205, a selector 1210, and registers reg1, reg3 (1206, 1207) to be set by the CPU 240 shown in FIGS. 3A and 3B.

In the free color process, an ND signal (M/3+C/3+Y/3) generated in the aforementioned masking UCR circuit and the value of the register reg3 (1206), determined by the color set by the operator, are multiplied in the multiplier 1205, of which output is selected by the selector 1210 and released as an output signal 1212.

In case the free color process is desired only in a part of the original, the area signal 1 (224-1) is shifted to "1" only in such desired area. In such case, however, the area signal 2 (224-2) is set at "0", as shown in the logic value table in FIG. 14. Thus the masking UCR circuit is so controlled, according to the signal 226 shown in FIGS. 3A and 3B, as to release the ND signal only in the area indicated by the area signal.

In case of the paint process, the selector 1210 is given the area signal 2 (224-2) at "1", so as to select the register 1

(1207) set by the CPU 240. In such case, the area signal 1 (224-1) is set at "0".

There are also shown a free color paint circuit 2 (1213) for cyan color, a free color paint circuit 3 (1216) for yellow color, and a free color paint circuit 4 (1219) for black color, with respective input signals Cin (1202), Yin (1203), Kin (1204) and output signals Cout (1215), Yout (1218), Kout (1221). These circuits are controlled by area signals 2 (224-2), 3 (224-3) and 4 (224-4).

In the display on the CRT 219, these area signals 224-1–224-3 are simultaneously enabled.

(Explanation of Control Unit)

Figure 15:
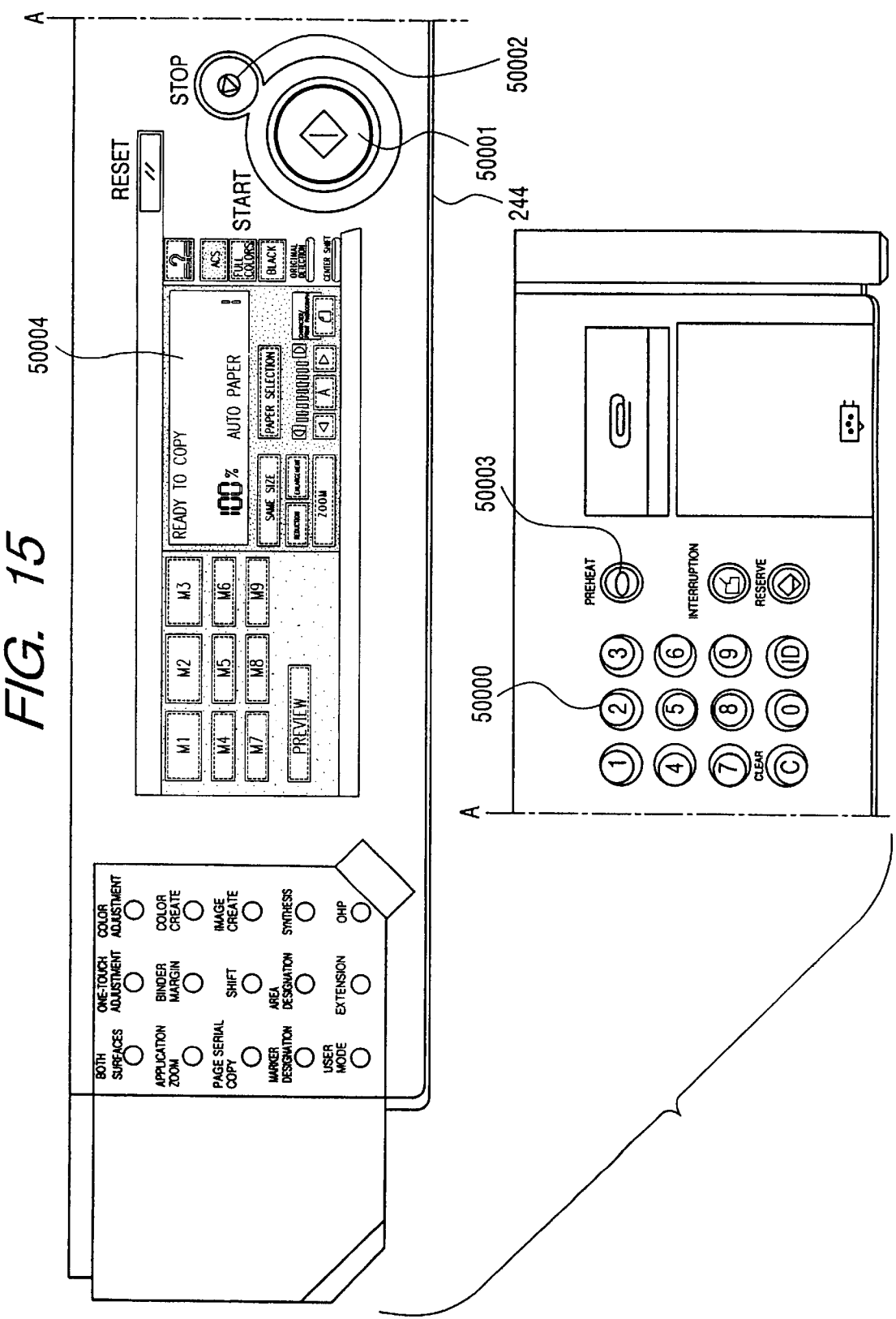
FIG. 15 is an external view of an operation unit in an embodiment.

FIG. 15 is an external view of the operation unit 244 of the present embodiment, wherein provided are numeral keys 50000, a copy start key 50001, a stop key 50002, a preheating key 50003, and a touch panel display 50004 provided with liquid crystal display means and designation means.

Figure 16:
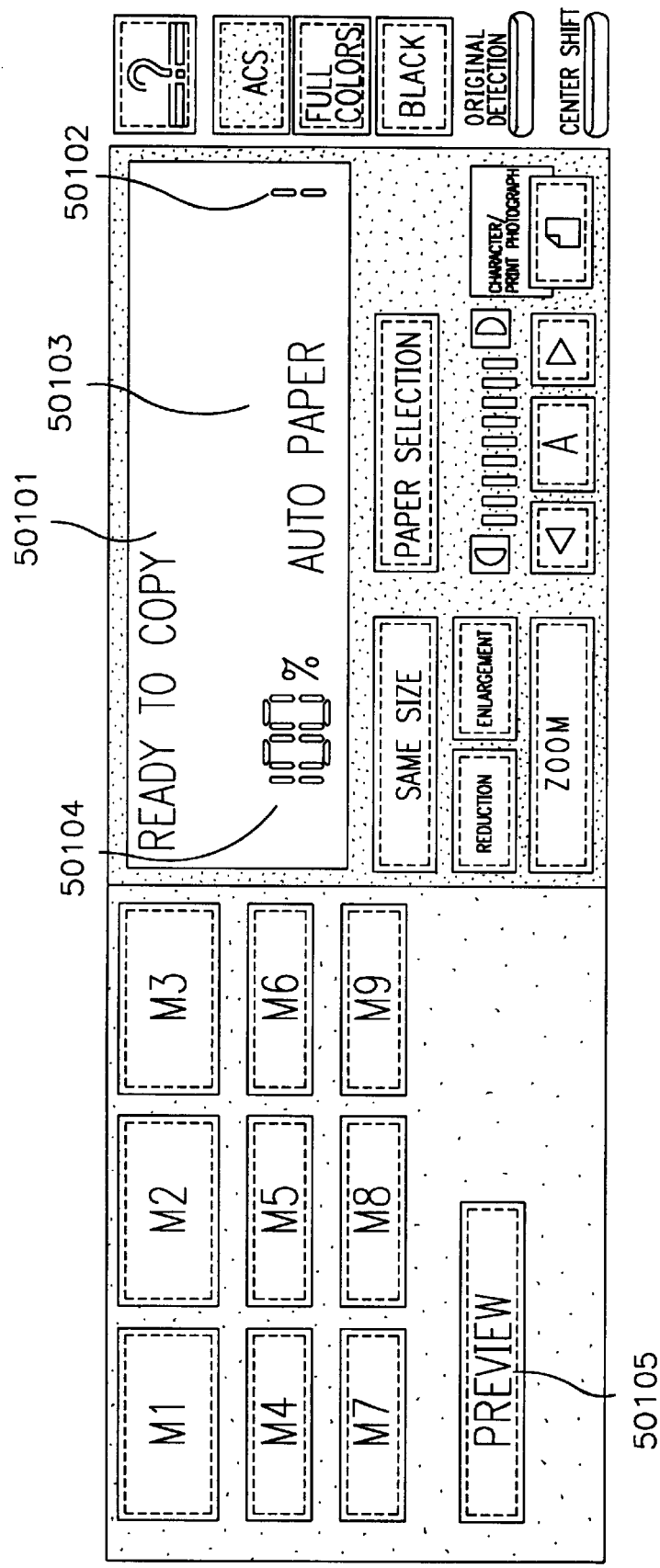
FIG. 16 is a view showing a standard image field of the display unit.

FIG. 16 is a view showing a standard image field of the touch panel display 50004, wherein displayed are a status 50101 of the apparatus, a copy number 50102, a sheet size 50103, a copy magnification 50104, and a touch key (soft key) 50105 for designating or canceling the preview mode.

Prior to the start of the preview process, the operator designates the image magnification, the sheet size and the editing process from the operation unit 244, and then depresses the preview mode key 50105 to shift the display from the standard image field to a preview operation image field.

Figure 17:
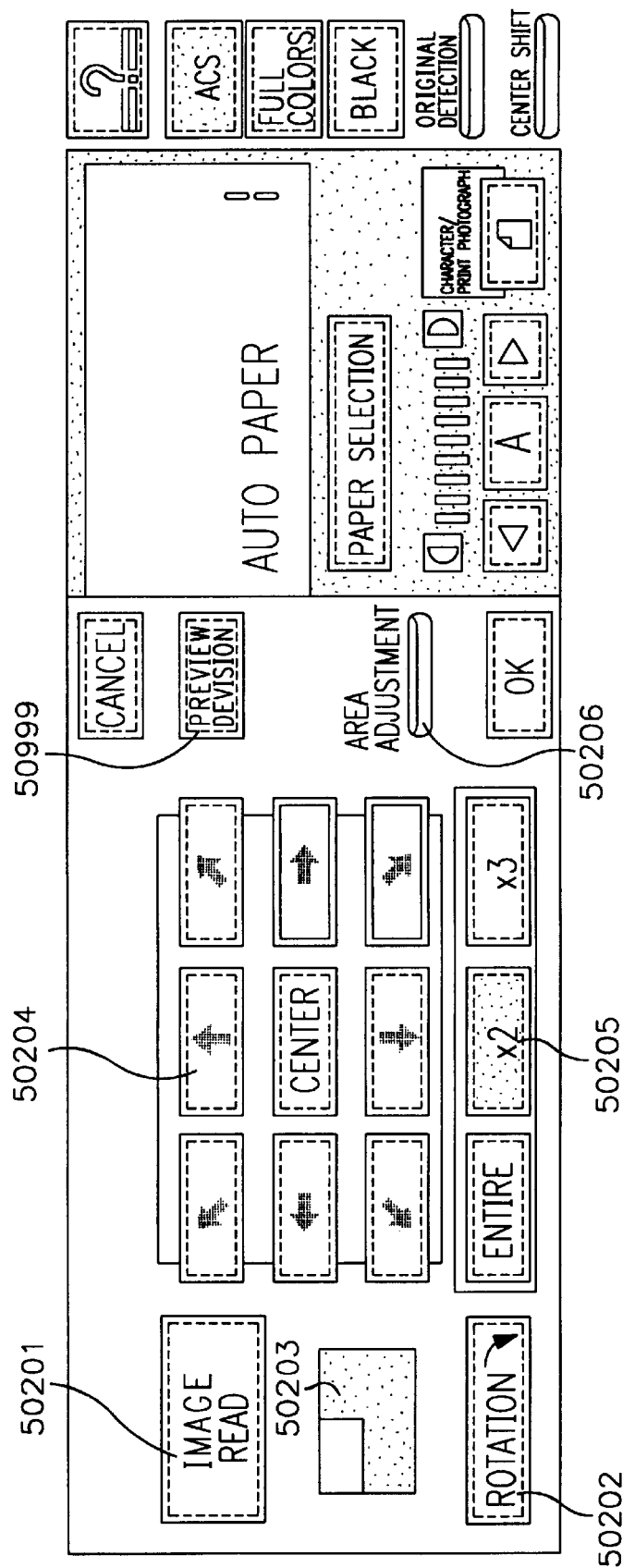
FIG. 17 is a view showing an example of preview operation image field.

FIG. 17 shows an example of the preview operation image field, wherein displayed are an image reading key 50201 for starting the preview, a display direction setting key 50202, an area monitor 50203, a display position setting key 50204, a display magnification setting key 50205, and an area adjusting key 50206 for fine adjustment of the area.

The operator at first sets the original on the original table or on a feeder, and sets the display direction (vertically or horizontally oblong) of the original, by means of the display direction setting key 50202. The display of this display direction is usually made in such a manner that the original reference position on the original table corresponds to the upper right corner on the CRT 219. When the display direction setting key 50202 is depressed, the display of the display direction setting key is inverted in color, and an image rotated by 90° is stored in the memories 217-11, 217-12, 217-13 shown in FIG. 11, whereby the original reference position on the original table is rotated by 90° and displayed on the monitor.

In response to the depression of the preview start key 50201 by the operator, the original, if set on the feeder, is supplied therefrom to the original table, and, if the prescanning is selected, there is executed a scanning operation in order to detect the size of the original placed on the original table. Then there is initiated a scanning operation for reading the image.

Thus obtained image signals are supplied, after various editing processes, to the preview process unit 217 shown in FIGS. 3A and 3B. After conversion into the RGB color signals, there is calculated a most efficient size for storing the entire image in the image memories 217-11 to 217-13, based on the display direction, display magnification, original size etc., and the data are thus stored. The data stored in the image memory have been subjected, in the gamma correction unit 217-4, to the correction according to the monitor characteristics. Then the image data are transmitted by a display controller 217-10 to the monitor 219 whereby the preview image is displayed.

If an area is designated in the editing process, the settings for the image magnification, image rotation and image displacement (corner displacement and center displacement) are disregarded, and the preview image is displayed in a state of equal size, no rotation and no displacement. This is because, for example if a corner displacement is set with a 50% reduction in size, it is difficult to confirm on the preview monitor whether the area is correctly set, and, in case plural areas are designated, the calculation of the area position on the monitor becomes complex for each area, thereby reducing the processing speed.

The image memories 217-11 to 217-13 have a capacity of 640×480×9×1920×1440 pixels. Consequently, in the data transfer from the image memories to the monitor 219, it is necessary to vary, by the display controller 217-10, the magnification of the data of the image memories based on the display size of the monitor and the display magnification set by the setting key 50205.

Figure 18:
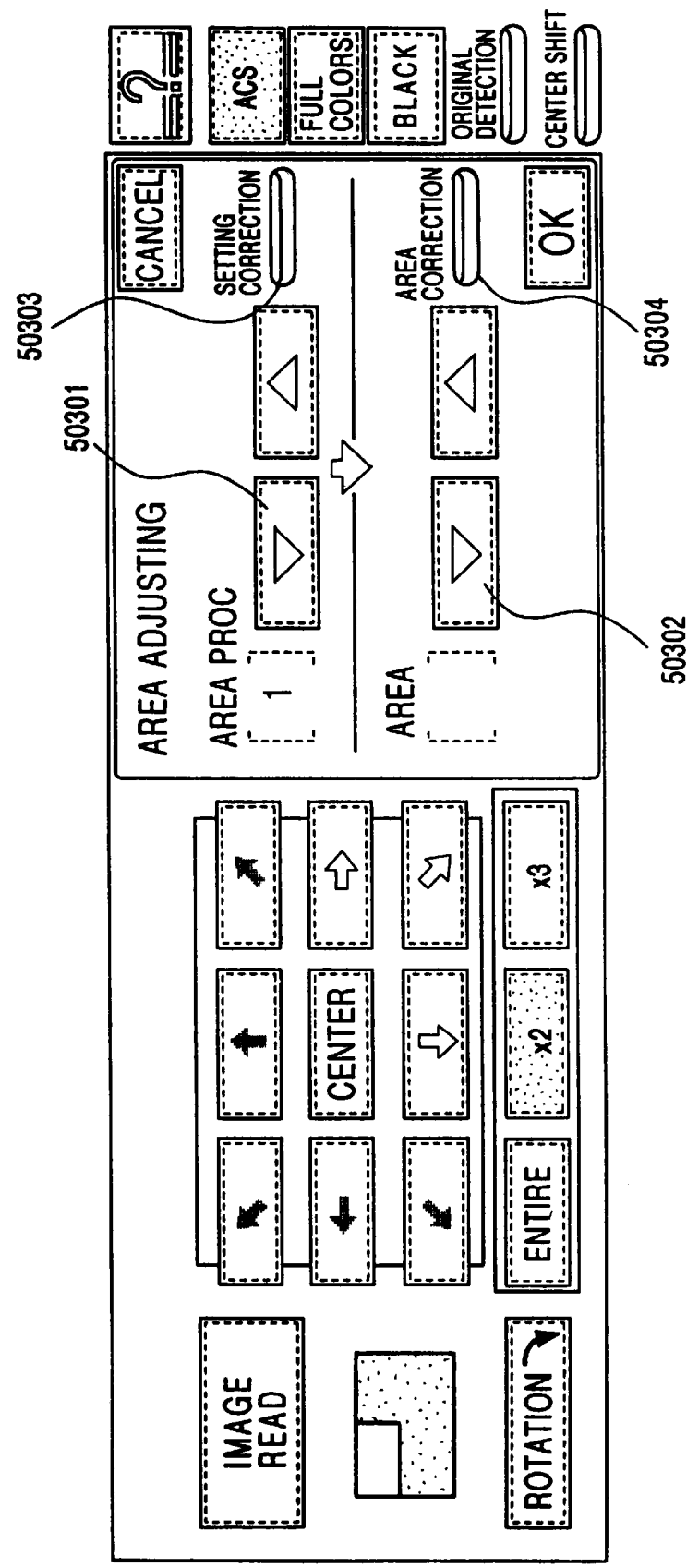
FIG. 18 is a view showing an example of image display for area adjustment.
Figure 19:
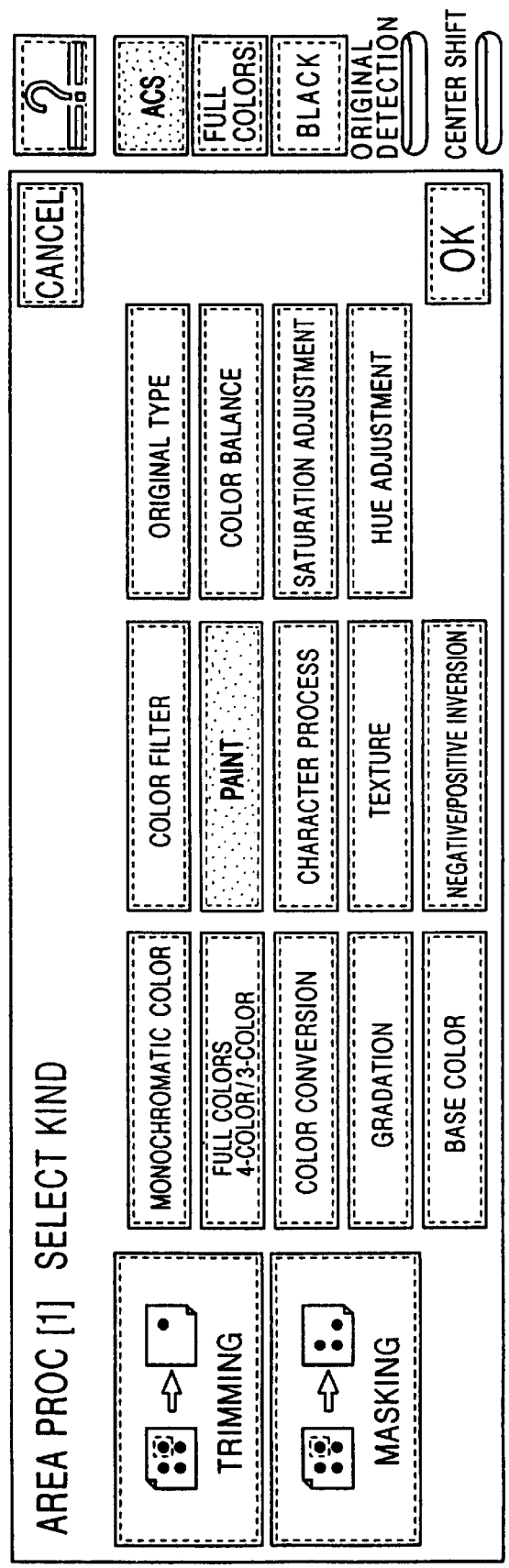
FIG. 19 is a view showing an example of image display for the selection of area process.

FIG. 18 shows an example of the display on the touch panel display at the area adjustment, and FIG. 19 shows an example of the display on the touch panel display at the selection of the area process.

Figure 21:
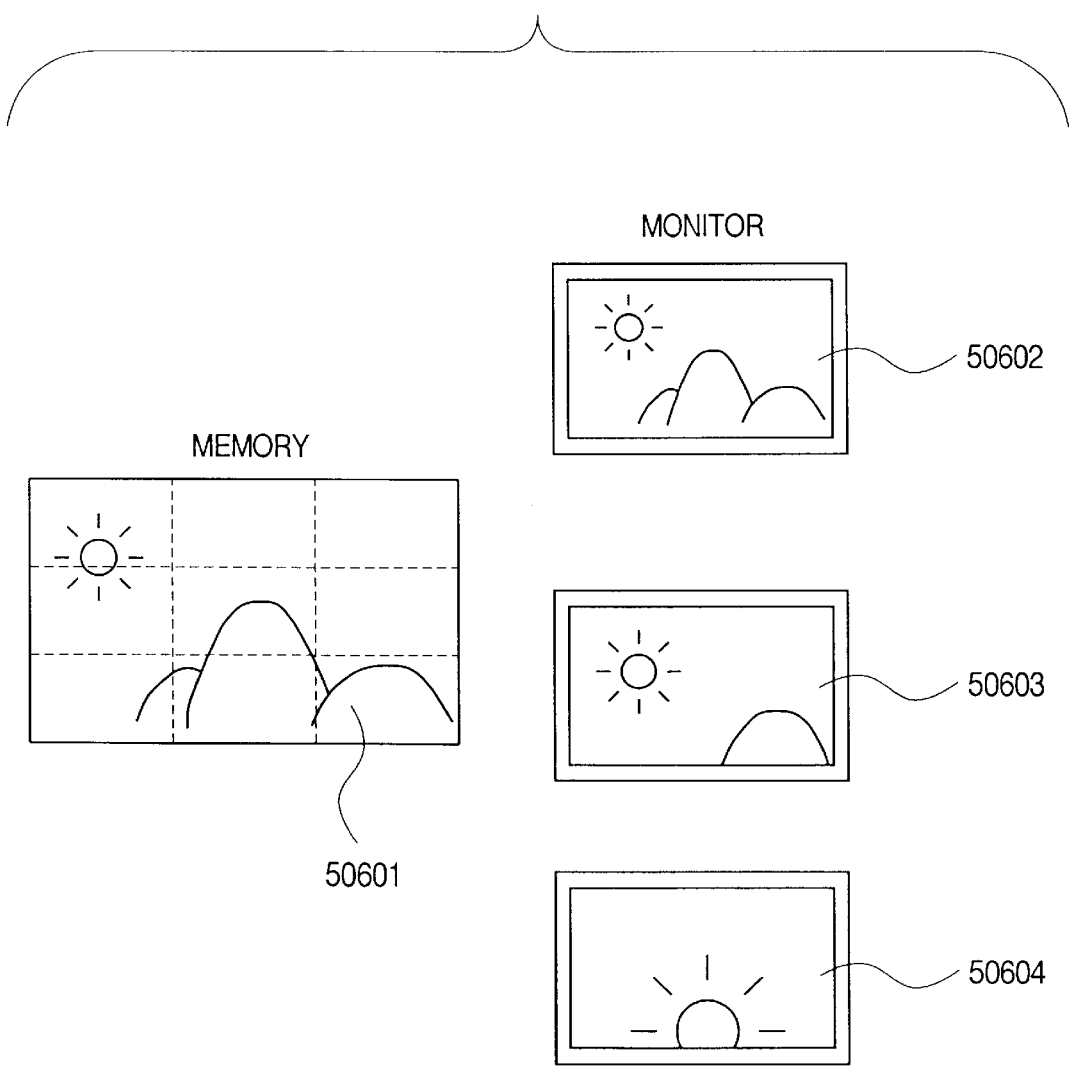
FIG. 21 is a view showing an example of change in the image magnification.

FIG. 21 shows a specific example of the variation of the display magnification.

When image data represented by 50601 are stored in the image memory, if "entire" is set for the magnification by the display magnification setting key, the entire data area of the image memory is reduced to ⅙ by the display controller 217-10 and displayed as shown by 50602 on the monitor 219. Also if a "2x" key is selected, the data of ⅘ of the area of the image memory are reduced to ¼ by the display controller 217-10 and displayed as shown by 50603 on the monitor 219. Thus a part of the data of the image memory is displayed in a doubled size, in comparison with the "entire" display.

If a "3x" key is depressed, the data of ⅑ of the area of the image memory is transferred in the equal size to the display memory, wherein a part of the image is displayed in a tripled size on the monitor 219.

When the doubled or tripled display is selected by the display magnification setting key, only a part of the image memory is displayed on the monitor 219. In such state, it is possible to display the undisplayed part by varying the readout position in the memory area. More specifically, if the display magnification setting key selects "2x", the image of an arbitrary ¼ area of the image memory is displayed. In such situation, by depressing a downward key of the display position setting keys 50204, a ¼ sized image with the readout start position displaced downwards by 4 dots is transferred to the CRT, whereby a lower part of the image that has not been displayed can now be displayed.

When a part of the memory readout area reaches an end of the memory, a displacement of the readout start position toward the end of the memory will involve an area outside the image memory. Thus, in order to inform the operator of a fact that the displacement toward the end is no longer possible, the display position setting key toward such end is displayed in a meshed state, and this key is no longer sensed. Also an area monitor 50302 is provided in order to enable the operator to confirm the displayed area within the memory area, in case of the image displacement.

(Area Correction in Preview Operation)

If the operator designates an area prior to the preview operation, there is given a preview display of the area processed image, in a state of equal size, no displacement and no rotation. If the position or the size of the area of the processed image is different from the designation by the operator, or if the processed color is slightly different from what the operator desires, the fine adjustment of the area can be made on the preview image.

Figure 22:
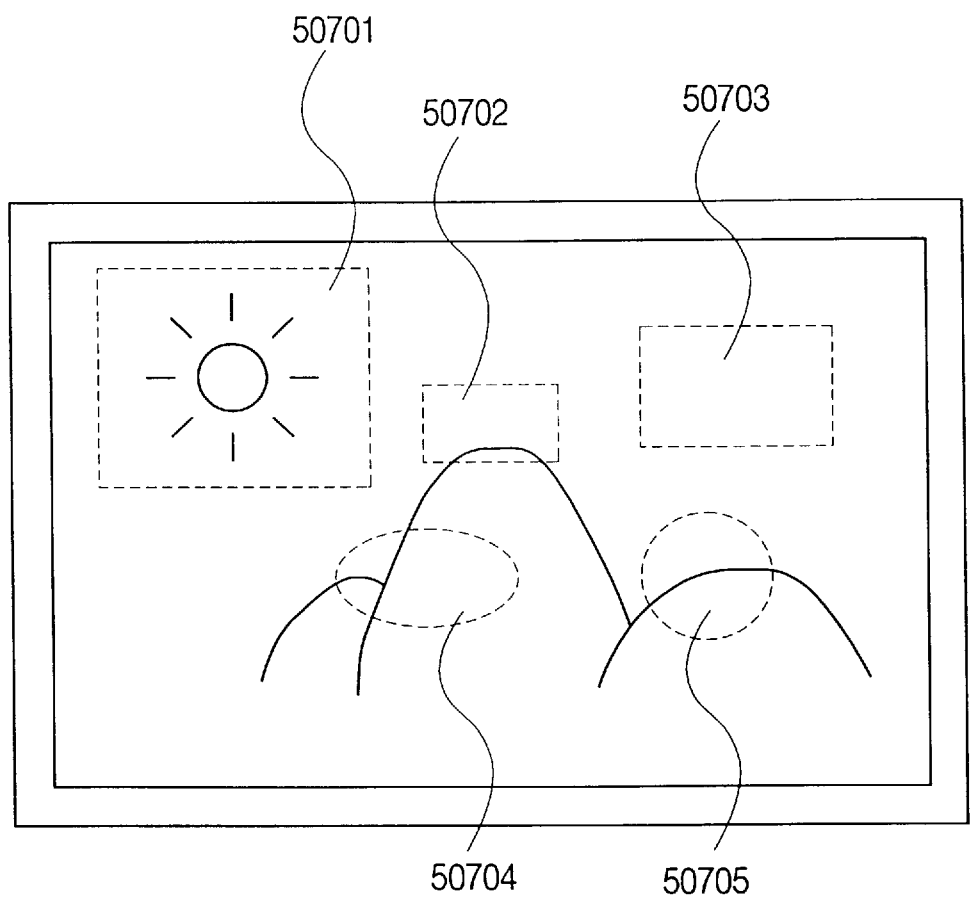
FIG. 22 is a view showing a preview image for area correction.

At first the operator depresses the area adjustment key 50206 to shift the display to an area selection image field, whereby, as shown in FIG. 22, the size and the position of the designated area are calculated from the copy magnification, the display magnification set by the display magnification setting key, and the display direction set by the display direction setting key, and the outer frame of the area is generated by the area generation unit (AGDC).

The area thus prepared is developed on an area image memory 1 (hereinafter called plane memory 1), then transferred to an area display memory 1 (hereinafter called plane memory 1') and displayed on the monitor 219. In this state, the outer frame of the area is displayed on the current preview image, with a color set in the plane memory 1. The plane memory mentioned above means a divided part of the memory 217-20.

The plane memory 1 has a size of several times of the size in pixels of the monitor. Based on the magnification set by the image magnification setting key and the display position set by the display area setting key, the transfer area and the transfer magnification of the plane memory 1 are calculated in the same manner as for the preview image, for transfer to the plane memory 1', so that, the display of the outer frame of the area is renewed, following the preview image, each time the settings of the display magnification and the display area are varied.

The present area process can set the content of process for 30 areas at maximum, and can set 15 areas at maximum for each area process. FIG. 22 shows an example of the preview image with plural area designations, wherein an area process 1 effects paint process on three areas 1 (50701), 2 (50702) and 3 (50703), while an area process 2 effects color conversion on two areas 1' (50704) and 2' (50705).

In case plural areas are set, the operator is required to designate an area by an area process number setting keys or an area number setting keys.

By selecting the UP key of the area process number setting keys, there is selected an area of the area process 1, and the outer frame (50701, 50702, 50703) of the area of the area process 1 is calculated in a similar process and developed on an area image memory 2 (hereinafter called plane memory 2) by the area generation unit.

This outer frame is transferred to an area display memory 2 (hereinafter called plane memory 2') with a magnification designated by the display magnification setting keys, whereby it is displayed on the monitor 219 with a color different from that of the display by the plane memory 1'. Since the plane memories 1' and 2' have mutually different display colors, the operator can recognize, by the color on the monitor 219, the outer frame of the area contained in the area process designated among plural processes.

Also when the area process number 2 is designated by selecting the UP key of the area process number setting keys, the outer frame of the area of the area process 1, written in the plane memory 2, is erased, and the outer frame of the area of the area process number 2 is written instead and displayed on the monitor 219.

Thus the operator can alter the content of the process, by setting the area process of which content is to be altered, then actuating the setting correction key 50303 and altering the content of the process on the image field for altering the content of the process, whereupon the altered content is reflected on the content of the process.

In case altering the area size, the operator at first selects an area process, including the area to be altered, by means of the area process number setting keys 50301 as explained in the foregoing, and then selects an area by the area number selection keys 50302. As an example, if the area 2' (50705) of the area process 2 is to be moved to the left by 1 cm, the operator at first selects the area process 2 by the area process number setting keys 50301, and then selects the area 1' (50704) of the area process 2 by the area number setting keys.

In this state, the outer frame of the area 1' is developed on an area image memory 3 (hereinafter called plane memory 3) by the area generation unit, is transferred to an area display memory 3 (hereinafter called plane memory 3') and displayed on the monitor. The color of the outer frame of the area, displayed on the monitor, is made different from the display colors for the plane memories 1', 2'.

Since the display memories are given the following order of priority:

plane memory 1'<plane memory 2'<plane memory 3', the operator can recognize the designated area process, on the monitor, among all the area processes and can also recognize the desired area in such area process, without the necessity of memorizing the area number requiring the correction.

Then, when the area 2' (50705) is set by the area number setting keys, the area 1' (50704) on the plane memory 3' is erased, and the area 2' is written in the plane memory 3 and displayed on the monitor 219.

In this manner the operator at first designates an area of which size is to be altered, and then actuates the area correction key 50304 to shift the display to the area size altering image field.

Figure 20:
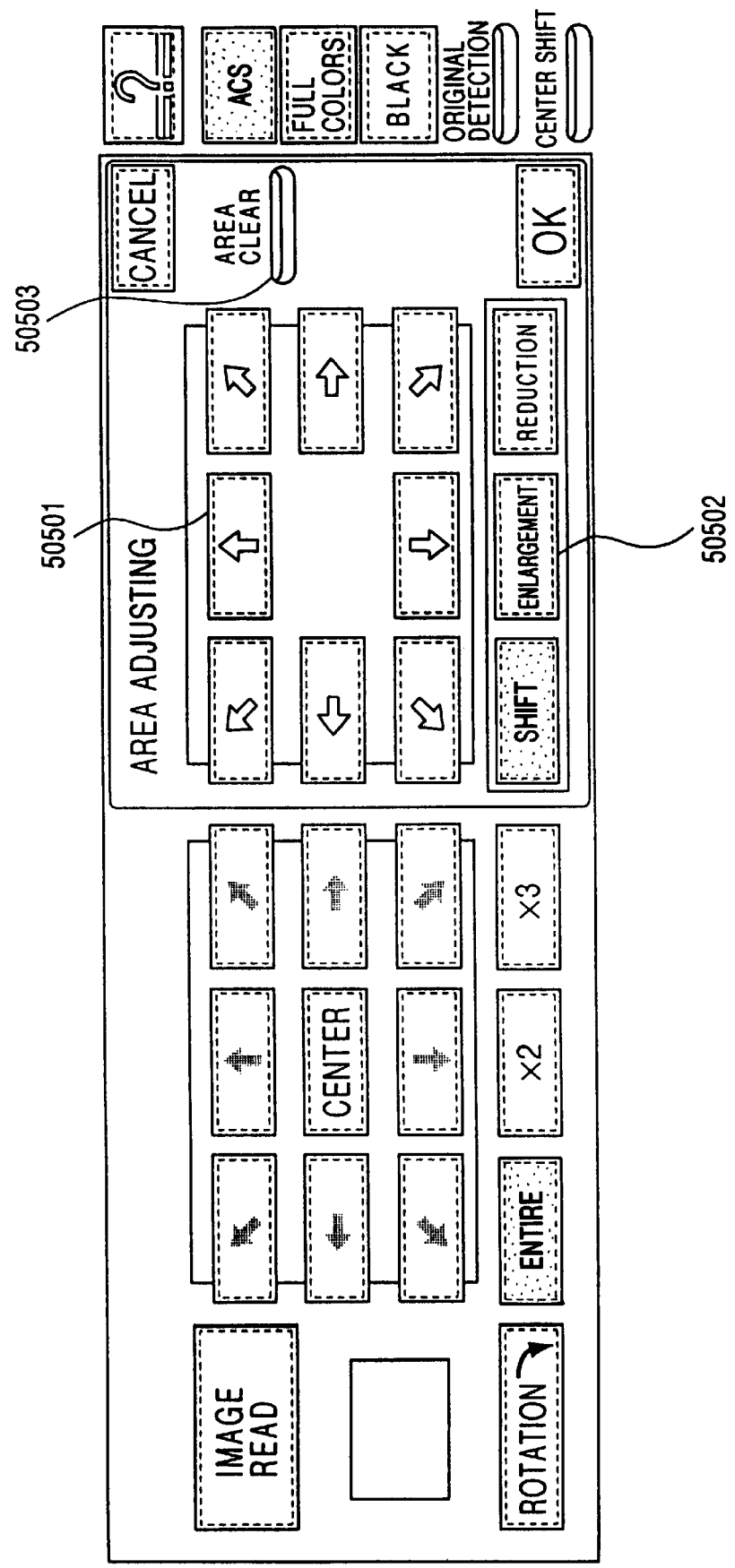
FIG. 20 is a view showing an image display for area size change.

FIG. 20 shows the area correction image field on the touch panel display, wherein shown are area correction keys 50501, area correction setting keys 50502 and an area clear key 50503.

As an example, if the area 2' is to be moved to the left, the displacement is designated by an area correction setting key, and a leftward arrow key in the area correction keys is actuated. In response the area 2' stored in the plane memory 3 is erased, and an area moved to the left by 4 pixels is formed on the plane memory 3, transferred to the plane memory 3' and displayed on the monitor.

Consequently the designated area actually moves on the preview image. The amount of displacement is fed back to the CPU 240, so that, when the image is displayed by repeated actuation of the image reading key, the area is processed in a position after the displacement.

It is thus rendered possible to move the area, while looking at the preview image and the designated area at the same time. Also the alteration of the area size can be achieved in arbitrary manner, by selecting the enlargement or the reduction by the area correction setting keys and actuating the area correction keys.

When the operator can obtain the desired image on the monitor 219 through the corrections on the size, position and content of the area in comparison with the preview image, the start key 50001 is actuated to obtain the output image from the printer unit.

As explained in the foregoing, the present embodiment provides a preview display in the equal size without displacement or rotation for the image for which the area is designated in the editing process, disregarding the setting for the altered magnification, displacement or rotation on such image, thereby preventing the lowering in the process speed resulting from the complex calculation of the display-position of the area on the monitor.

[Variation]

In the foregoing embodiment, the preview display is provided in the equal size without displacement or rotation in case of the area designation, but it is also possible to provide the preview display in the equal size without displacement or rotation, in case the area correction is selected.

More specifically, in response to the actuation of the area adjustment key 50206, the display shifts to the area selecting image field and, if the original is set on the feeder, it is fed therefrom to the original table. Also if the pre-scanning operation is selected, a scanning operation is conducted to detect the size of the original placed on the original table.

Then the scanning operation is started for reading and fetching the image. The read image is subjected to preselected various editing processes, and the signals are supplied to the preview process unit 217. After the conversion into RGB color signals, there is calculated the most efficient size for storing the entire image in the image memory, based on the selected display direction, the original size etc., and the data are stored in the image memory.

The data in the image memory are corrected in the monitor gamma correction unit 217-4 according to the characteristics of the monitor, and are transferred by the display controller 217-10 to the monitor and displayed thereon.

Upon shifting to the area selecting image field, there are calculated, as shown in FIG. 22, the position and the size of the entire area set by the area designation, in a state of the equal size without displacement, regardless of the setting for the copying magnification or the output position, and the outer frame of the area is generated in the area generation unit (AGDC). Thus generated outer frame of the area is developed on the area image memory 1 (hereinafter called plane memory 1), then transferred to the area display memory 1 (hereinafter called plane memory 1') and displayed on the monitor.

The area is displayed, on the monitor, in superposition with currently displayed equal-sized preview image, and with a color set for the plane memory 1. Then the area correction is executed in the same manner as in the foregoing embodiment. Then, when the image is read again for confirming the result of correction, the preview display is given in the equal size, without displacement or rotation.

When the operator can obtain the desired image on the monitor 219 through the corrections on the size, position and content of the area in comparison with the preview image, the start key 50001 is actuated to obtain the output image from the printer unit.

FIG. 23 shows examples of principal control commands in the communication interface which controls the controller 2007 and the copying apparatus consisting of the units 351, 352.

A code 01 indicates an interface clear command, which is issued by the copying apparatus after its initialization.

A code 02 indicates a print start command, which is issued by the transmitting unit of the image data, such as the controller 2007, for causing the printing operation to be executed.

A code 03 indicates a status request command, which is issued by the master (controller 2007) for inquiring the status (presence or absence of error etc.) in the copying apparatus.

A code 04 indicates a status transfer command, which is issued by the slave (CPU 240 of the copying apparatus) in returning the status of the copying apparatus, in response to the request of the status from the master (controller 2007).

A code 05 indicates an image transfer end command, which is issued by the transmitting unit of the image data after the transfer thereof.

A code 06 indicates a preview start command, which is issued by the master to the copying apparatus for the preview control.

In the following there will be explained a case of printing the image information sent from the host computer 2006 through the controller 2007.

When the power supply to the copying apparatus is turned on, it executes a predetermined initializing operation by itself, and issues the interface clear command after the completion of the initialization. Thus the host computer 2006 and the controller 2007 discriminate that the interface is in the usable state.

Then, when the copying apparatus becomes ready for the copying operation by the warming-up operation, the printer ready signal supplied to the controller 2007 becomes active. Similarly, when the controller 2007 becomes ready for transmission and reception of the image data by initialization, the controller power ready signal sent to the copying apparatus becomes active.

The controller 2007 issues the state request command to the copying apparatus at a predetermined interval, and in response the copying apparatus returns the status, by which the controller 2007 receives information such as the printer status and the error state of the copying apparatus.

FIG. 24 shows examples of the principal control commands for controlling the preview operation of the controller and the copying apparatus.

A code 21 indicates a preview setting request command, which is issued by the master (controller 2007) in order to inquire the current setting of the preview control, and to which the slave (CPU 240) returns the status of setting.

A code 22 indicates a preview permission command, for setting whether or not to permit the preview display in the copying apparatus.

A code 23 indicates a preview clear command, for clearing the currently displayed image on the monitor 219.

A code 24 indicates a preview key permission command, for setting whether or not to permit predetermined key operations on the operation unit 244 in the course of display of the image from the external equipment.

A code 25 indicates a preview procedure command, for designating the procedure of preview display and print sequence.

A code 26 indicates a review image processing command, for designating presence or absence of the image processing on the displayed preview image.

Figure 28:
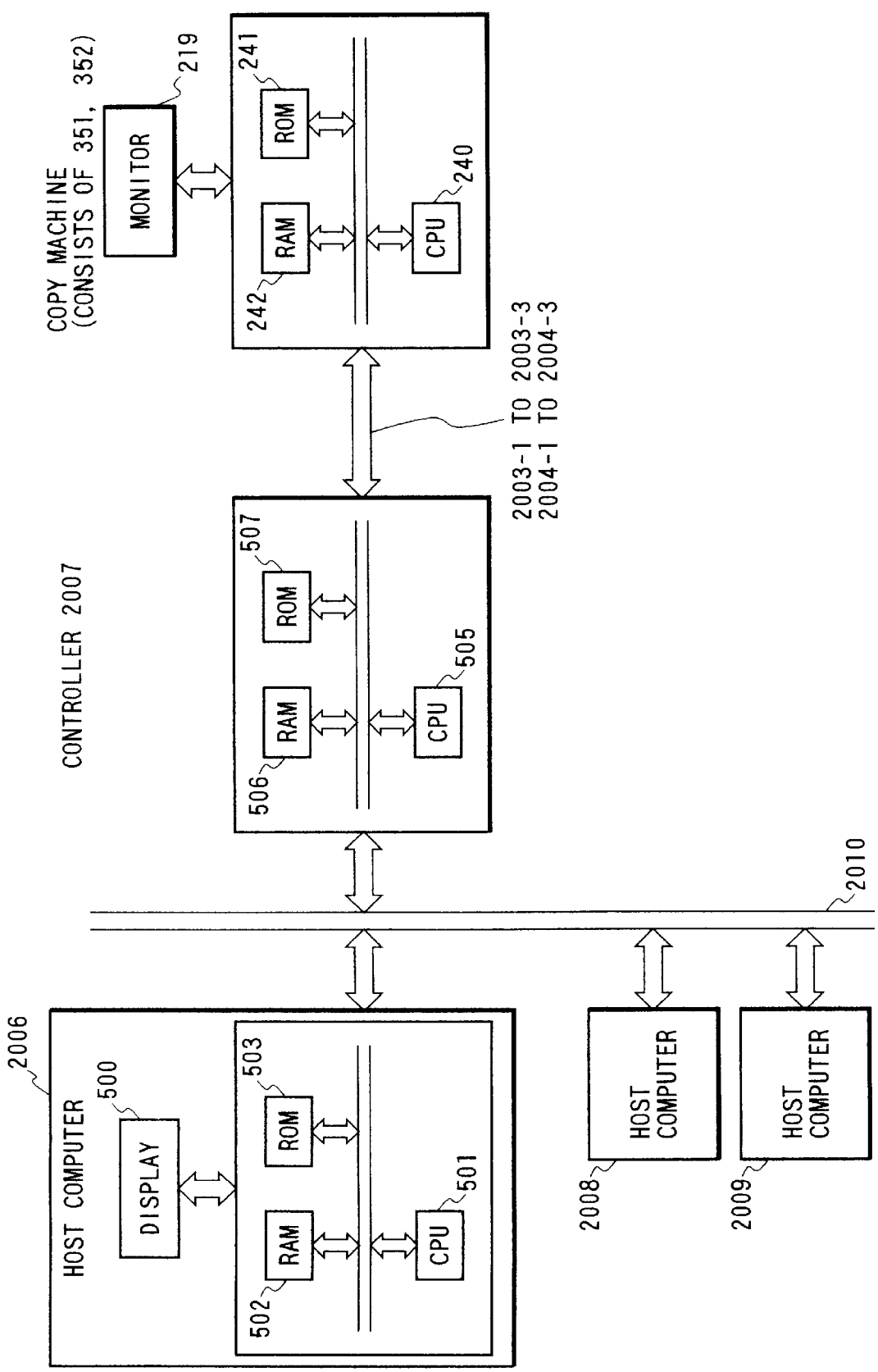
FIG. 28 is a view showing the configuration of a copying apparatus, a controller 2007 and a host computer 2006.

FIG. 28 is a block diagram showing the configuration for preview control by the copying apparatus consisting of the units 351, 352, the controller 2007 and the host computer 2006. The host computer 2006, the controller 2007 and the copying apparatus are respectively provided with CPUs 501, 502, 240 by which the preview process of the present embodiment is controlled. Similarly there are provided RAM's 502, 506, 242 as work areas respectively for the CPUs 501, 502, 240. There are further provided ROMs 503, 507, 241 for storing the programs to be executed respectively the CPUs 501, 502, 240.

The host computer 2006 is provided with a display 500, independent from the monitor 219. In the present embodiment, the presence of the monitor 219 in the copying apparatus provides the following advantages: (i) The parameters dependent on the characteristics of the copying apparatus such as of gamma correction and edge enhancement may be used in the process in the copying apparatus without the control of the host computer, and the result of such process can be confirmed on the copying apparatus. This is particularly effective when the monitor 219 has satisfactory performance in resolution, gradation and color characteristics; (ii) In case of real-time synthesis of the image from the CCD 201 and the image from the host computer 2006, the result of synthesis can be confirmed on the copying apparatus.

In such modes of use, if the host computer 2006 or the controller 2007 once transmits the image information and the commands relating to the preview operation to the copying apparatus, the subsequent preview and print operations can be completed in the copying apparatus.

The host computer 2006 and the controller 2007 may be connected to a network 2010, and other similar host computers 2008, 2009 etc. may also be connected to the network 2010 for shading the controller 2007 and the copying apparatus.

In the following there will be explained the outline of the preview control.

After the printing operation is enabled, the controller 2007 issues the preview setting request command (code 21) to request the information on the preview setting in the copying apparatus, which in response returns the information on the current preview setting. If an image of the preceding preview operation remains in the preview image memories 217-11 to 217-13, there may be issued the preview clear command (code 23) to replace the data of the above-mentioned preview image memories with predetermined data, thereby clearing the preview display image field. At the start of power supply to the copying apparatus, it is assumed that the preview display image field is cleared as a part of the initialization of the copying apparatus, even without such preview clear command.

For executing the preview display, there are issued various control commands relating thereto.

At first the controller 2007 issues the preview permission command (code 22) for designating permission/inhibition of the preview display, whereby the preview display can be turned on and off.

Then the preview procedure command (code 25) is issued to designate the procedure of the preview operation. The procedure of the preview operation can be determined in advance, such as (1) the normal sequence, in which, after the image data transfer from the controller 2007, there is executed the predetermined image processing, and the preview operation is executed as soon as the image data are stored in the preview process unit 217, or (2) the issuance of the print command, by which, after the image data transfer from the controller 2007, there is executed the preview operation together with the printing operation.

Then the preview image process command (code 26) is issued to designate the presence or absence of the image processing on the displayed preview image. It is thus possible to designate, in advance, the image processing on the displayed preview image, such as (1) providing preview display of the image, obtained by effecting predetermined image processing on the image data transferred from the controller 2007, or (2) providing preview display of the image, obtained from the image data transferred from the controller 2007, without image processing. It is therefore possible to effect the preview display by selecting either after or before the image transmitted from the controller 2007 is subjected to the image processing (editing, color conversion, gradation correction etc.) in the copying apparatus thereby confirming the output image prior to the output of the copy.

When the preview start command (code 06) is issued, the preview display operation is instructed from the controller 2007 to the copying apparatus, which then processes the image data and displays the preview image on the CRT 219. By the issuance of the print start command (code 02) after the confirmation of the preview image, the image data stored in the image memory 208 are read according to the predetermined printing sequence to provide the final copied image.

In case of synthesized copying of the image read from the reflective original and the input image from the external interface 2001, the predetermined image processing is executed by the preview image process command (code 26), then the preview display is turned on by the preview start command (code 06), and the image synthesized in the image memory 208 is displayed for preview on the CRT 219. It is also possible, when the input image from the external interface 2001 prior to the synthesis is stored in the image memory 208, to issue the preview start command (code 06) in order to confirm the image prior to the synthesis on the CRT 219, then to read the reflective original through the operation unit 244 and to confirm the synthesized image after synthesis with the input image supplied from the external interface 2001 on the CRT 219. By the issuance of the copy command or by the instruction of copy start through the operation unit 244 after the confirmation of the preview image, the image data stored in the image memory 208 are read according to the predetermined printing sequence to provide the final copied image.

The above-mentioned commands are transmitted from the controller 2007 to the copying apparatus in response to the instruction of the operator on the host computer 2006.

Figure 29:
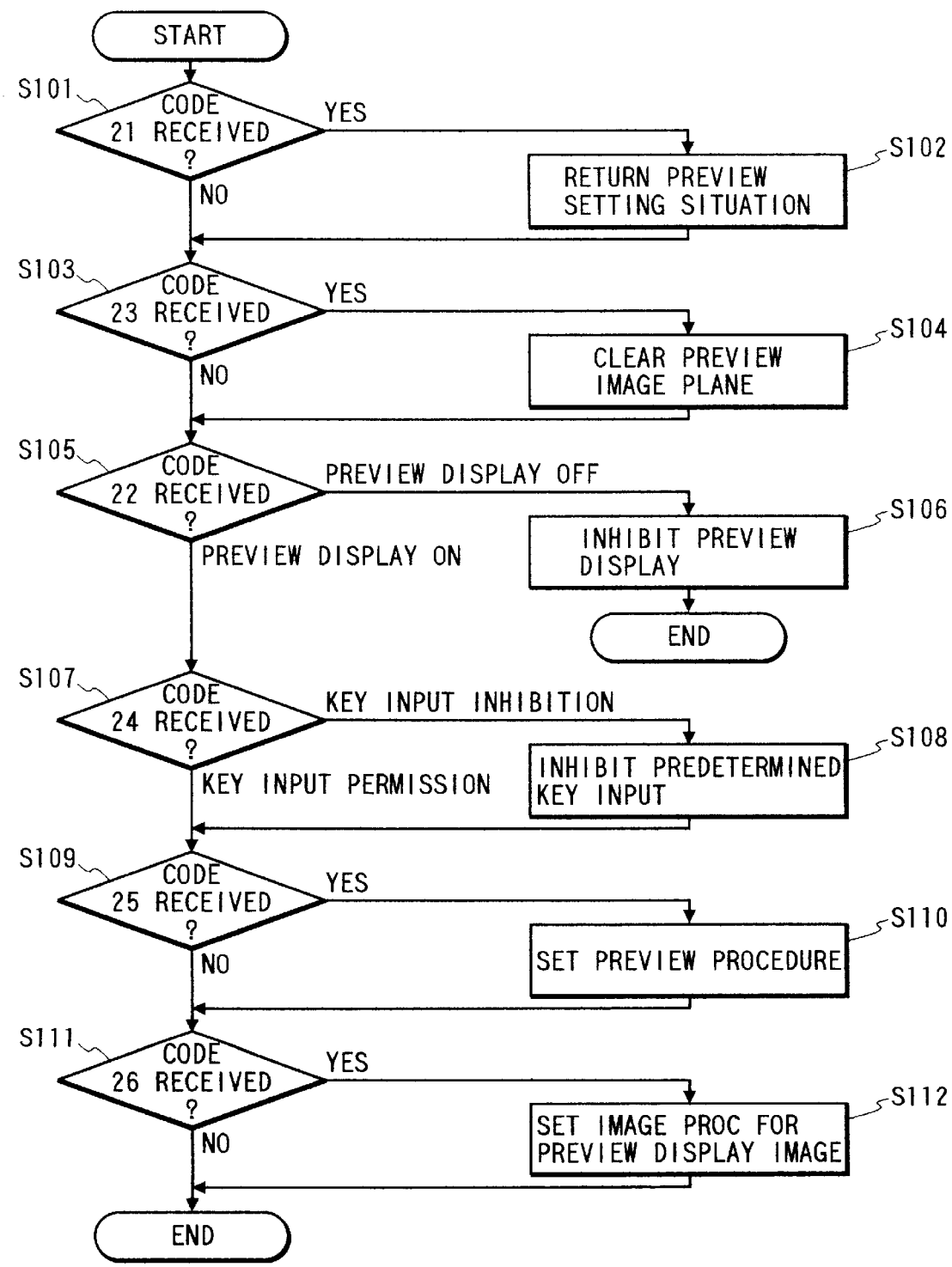

In the following there will be explained, with reference to FIGS. 29, 30 and 31, an example of the control sequence of the CPUs 240, 505, 501 of the copying apparatus, the controller 2007 and the host computer 2006.

[CPU 240]

In case a code 21 is received in the communication of the controller 2007 with the CPU 505 (step S101), the data relating to the preview setting are returned to the controller 2007 (step S102). Also a code 23 is received (step S103), the image memories 217-11 to 217-13 are cleared to clear the preview image field (step S104). In case a code 22 instructs turning-off of the preview display (step S105), the preview display is inhibited (step S106). Also in case a code 24 inhibits the key input by the operation unit (step S107), there are inhibited the inputs by predetermined keys on the operation unit 244 such as the preview key (step S108). Also in case a code 25 is received (step S109), there is set a preview procedure according to the instruction of the code 25 (step S110). In case a code 26 is received (step S111), there is set a matching image processing (step S112).

[CPU 505]

The CPU 505 executes communication with the CPU 240 of the copying apparatus according to the following procedure.

At first it issues a code 03 (step S201) and receives a code 04 (step S202). If the printing operation is identified enabled by this code (step S203), a code 21 is issued (step S204). If the returned data indicate that the previous preview image still remains (step S205), a code 23 is transmitted as an instruction to clear the image (step S206). Then a code 22 is transmitted (step S207), and, in case of permitting the preview display (step S208), codes 24, 25, 26 are transmitted according to the instruction from the host computer 2006 (step S209).

[CPU 501]

The CPU 501 executes communication with the CPU 505 of the controller in the following manner, in response to the instruction of the operator.

At first, if the preview control is instructed by the operator (step S301) and when information whether or not to permit the preview is entered (step S302), a code 22 is issued (step S303).

Also if an instruction relating to the preview key permission is entered (step S304), a code 24 is issued (step S305).

Then the preview procedure and the preview image processing are designated (steps S306, S308), codes 25, 26 are respectively issued (steps S307, S309).

As explained in the foregoing the CPUs execute the sequences based on the programs for the preview control.

The host computer and the controller may be constructed separately as explained in the foregoing, or the functions of the controller may be incorporated in the host computer.

In case plural host computers can be connected as shown in FIG. 28, it is also possible to provide the controller 2007 with a function for managing the access from such plural host computers, such as, during the execution of the preview control procedure by a host computer, to inhibit the access (for example the request for preview) from other host computers.

Also in the present embodiment, the preview control command is rendered capable of various preview operation controls such as the permission/inhibition of the preview operation, the on/off of the preview display etc., but it can further be applied, within the scope of the present invention, to the control on the operations of the copying apparatus and the preview operations by the controller 2007.

Also in the present embodiment, it is assumed that the exchange of the image data between the host computer 2006 and the image forming apparatus (exemplified in the present embodiment by a color electrophotographic copying apparatus) is conducted through the external controller 2007, and such image data can be of the RGB (red, green and blue) system or of the CMYK (cyan, magenta, yellow and black) system.

Also in the present embodiment, the preview operations are controlled by various commands issued from the controller 2007, but such control may also be achieved, instead of the communication commands, by a signal line provided between the controller 2007 and the image forming apparatus and adapted to designate predetermined preview modes.

[Embodiment 2]

This embodiment provides a correlation between the functions of the operation unit of the copying apparatus and the preview operations instructed from the host computer 2006 or the controller 2007.

It is in particular featured by permitting or inhibiting all or a part of the key operations of the operation unit relating to the control of the preview image display means.

In case the host computer 2006 and the copying apparatus are provided for example in mutually distant locations, after the preview display of the image data transmitted from the host computer 2006 through the controller 2007, there may be executed a local copying operation in the copying apparatus alone, independently from the image data from the controller. In such situation, if the preview operation is conducted in such local copying operation, the image data which have been transmitted from the controller 2007 are replaced, before the confirmation of the preview image, by the image data for the local copying operation, so that the operator cannot confirm the image from the controller 2007.

In the present embodiment, when the controller 2007 issues the preview permission command, the key input operations on the operation unit of the copying apparatus are inhibited, and, after the confirmation of the preview display of the image from the controller, the print command is issued to obtain the print of thus confirmed image.

It is also effective, upon preview display of the image received from the controller 2007, to permit the input operations of a part of the operation keys and to inhibit the input operations of other keys. As an example, in the course of the preview display, the preview key 50105 alone is enabled on the operation unit (FIG. 16). In case the operator wishing a local copying operation actuates the preview key or any other key, there may be displayed a message "Preview display in progress on the image from the controller" on the image field 50101 of the operation unit. It is also effective to display a message "Do you wish to clear the preview display of the image from the controller?" and to provide the operator with selection to clear the preview display by the actuation of an unrepresented preview image clear key. In this manner it is rendered possible to provide a warning in order to avoid careless clearing of the preview display of the image from the controller, and to prevent the undesirable occupied state of the copying apparatus by the controller 2007, encountered if the preview control therefrom is not released.

Consequently the present embodiment is to resolve various drawbacks by making adjustment between the preview setting from the operation unit of the copying, apparatus and that from the controller.

The embodiments 1 and 2 have been explained by a copying apparatus having four photosensitive drums, but the present invention is applicable to various image forming apparatus such as a copying apparatus with a single photosensitive drum.

As explained in the foregoing embodiments, in the image forming apparatus provided with image reading means for reading an image by scanning an original, external input means for entering image information from a host computer or another external equipment, memory means for storing image based on the read image information and/or the externally entered image information, and image forming means for forming a reproduced image based on thus stored information, there is provided preview image display means for rendering the image information visible prior to the image formation, thereby enabling confirmation of an image, substantially equivalent to the final image, on the CRT display.

Besides the external input means is provided with interface means, and, based on at least either of an operation mode signal and an operation mode command transmitted from the host computer or the external equipment to the image forming apparatus through the above-mentioned interface means, there can be selected a display mode for displaying the input image information on the preview image display means, and there is also rendered possible to effect on/off control of the preview image display means or to clear the image display.

It is also made possible to prevent careless change of the preview image, by inhibiting or permitting all or a part of the key operations on the operation panel, relating to the operation control of the preview image display means. Inversely the preview display may be made directly controllable from the operation unit.

Furthermore, based on at least either of the above-mentioned operation mode signal and the operation mode command, the image display mode of the preview image display means can be selected. For example, there can be selected a mode of previewing the image information from the host computer or the external equipment but not executing image formation on such image information, or a mode of executing the image formation simultaneous with the preview display.

It is furthermore possible to preview display the synthesized image information, synthesized from the image information from the host computer or the external equipment and that obtained in the image reading means. Therefore, even in an image processing or an editing process of which final output is difficult to foresee, the effect of such process can be easily confirmed by the preview display.

Also in the preview display of the image information from the host computer or the external equipment, the image before or after a predetermined image processing can be displayed for preview, according to the image processing mode in the image forming apparatus.

The control of the present invention is naturally applicable also to a case where the effect of the present invention is achieved, instead of the ROMs 505, 501, 240 mentioned above, by the supply of a program stored in a memory medium such as a CD-ROM or a floppy disk to a system or an apparatus. In such case the memory medium storing the program relating to the present invention constitutes the prevent invention, and an apparatus such as a host computer or a controller functions according the sequence of the program, by reading the program from such memory medium by means of a CPU of such apparatus.

The printer can also be an electrophotographic printer provided with a photosensitive drum, an ink jet printer or a thermal transfer printer.

As explained in the foregoing, the present invention enables satisfactory control of the image forming apparatus provided with preview display means from the external equipment.

The present invention is not limited to the foregoing embodiments, but is subject to various modifications within the scope and spirit of the appended claims.

What is claimed is:

1. An image processing apparatus provided with:

reading means for reading an image and generating an image signal;

image forming means for forming an image, based on the image signal generated by said reading means, on a recording medium; and display means for displaying the image to be formed by said image forming means;

the apparatus comprising input means for entering an image signal from an external equipment;

wherein the image formation by said image forming means and the display by said display means are made possible based on the image signal entered by said input means.

2. An image processing apparatus according to claim 1, further comprising reception means for receiving, from said external equipment, a control signal for controlling said display means.

3. An image processing apparatus according to claim 2, wherein said reception means utilizes bidirectional communication.

4. An image processing apparatus according to claim 2, wherein said control signal effects on/off control of said display means.

5. An image processing apparatus according to claim 2, wherein said control signal instructs clearing of the image display of said display means.

6. An image processing apparatus according to claim 2, further comprising a control unit, wherein said control signal inhibits or permits all of a part of key inputs of said control unit.

7. An image processing apparatus according to claim 2, wherein said control signal designates a process mode of effecting display by said display means, without image formation by said image forming means.

8. An image processing apparatus according to claim 2, wherein said control signal designates a process mode of effecting image formation by said image forming means and display by said display means in parallel manner.

9. An image processing apparatus according to claim 2, wherein said control signal designates the selection of a display mode by said display means.

10. An image processing apparatus according to claim 1, for synthesizing the image signal generated by said reading means and the image signal entered by said input means, and for displaying the synthesized image on said display means.

11. An image processing method for controlling an image processing apparatus provided with:

reading means for reading an image and generating an image signal;

image forming means for forming an image, based on the image signal generated by said reading means, on a recording medium;

display means for displaying the image to be formed by said image forming means; and input means for entering an image signal from an external equipment;

wherein the image formation by said image forming means and the display by said display means are made possible based on the image signal entered by said input means.

12. An image processing apparatus comprising:

supply means for supplying an image signal from an external equipment to an image processing apparatus provided with reading means for reading an image and generating an image signal, image forming means for forming an image, based on the image signal generated by said reading means, on a recording medium, and display means for displaying the image to be formed by said image forming means; and output means for outputting a control signal for controlling the display by said display means.

13. An image processing apparatus according to claim 12, wherein said output means utilizes bidirectional communication.

14. An image processing apparatus according to claim 12, wherein said control signal effects on/off control of said display means.

15. An image processing apparatus according to claim 12, wherein said control signal instructs clearing of the image display of said display means.

16. An image processing apparatus according to claim 12, wherein said control signal designates a process mode of effecting display by said display means, without image formation by said image forming means.

17. An image processing apparatus according to claim 12, wherein said control signal designates a process mode of effecting image formation by said image forming means and display by said display means in parallel manner.

18. An image processing apparatus according to claim 12, wherein said control signal designates the selection of a display mode by said display means.

19. An image processing method for controlling an image processing apparatus provided with reading means for reading an image and generating an image signal, image forming means for forming an image, based on the image signal generated by said reading means, on a recording medium, and display means for displaying the image to be formed by said image forming means; said method comprising:

a supply step of supplying an image signal from an external equipment to said image processing apparatus; and an output step of outputting a control signal for controlling the display by said display means.

20. An image processing apparatus provided with first supply means for supplying image forming means, adapted to form an image based on an image signal on a recording medium, with said image signal and second supply means for supplying display means, adapted to display an image to be formed by said image forming means, with an image signal representing said image, said apparatus comprising a function of effecting mediation between plural instructions for the display by said display means for mutually different plural instructions means.

21. An image processing apparatus according to claim 20, wherein said plural instruction means are an operation unit of said image forming means and an external computer.

22. An image processing apparatus according to claim 20, wherein said plural instruction means are mutually independent plural computers.

23. An image processing method provided with a first supply step for supplying image forming means, adapted to form an image based on an image signal on a recording medium, with said image signal and a second supply step for supplying display means, adapted to display an image to be formed by said image forming means, with an image signal representing said image, said method comprising a step of effecting mediation between plural instructions for the display by said display means from mutually different plural instructions means.

* * * * *

UNITED STATES PATENT AND TRADEMARK OFFICE
CERTIFICATE OF CORRECTION

PATENT NO. : 5,844,689

DATED : December 1, 1998

INVENTOR : MICHIO KAWASE

It is certified that error appears in the above-identified patent and that said Letters Patent is hereby corrected as shown below:

COLUMN 6

Line 10, "uncount" should read --upcount--.

COLUMN 13

Line 9, delete "d".

COLUMN 14

Line 53, "Y2=a11*Y+a12*M1+a13*C1+a14*K1" should read --Y2=a11*Y1+a12*M1+a13*C1+a14*K1--.

COLUMN 27

Line 17, "prevent" should read --present--.

Line 64, "all of" should read --all or--.

Signed and Sealed this

Tenth Day of August, 1999

Q. TODD DICKINSON

*Attest:*

*Attesting Officer*       Acting Commissioner of Patents and Trademarks